US010442092B2

(12) United States Patent
Nishimura et al.

(10) Patent No.: US 10,442,092 B2
(45) Date of Patent: Oct. 15, 2019

(54) FORCE DETECTION DEVICE AND ROBOT

(71) Applicant: Seiko Epson Corporation, Tokyo (JP)

(72) Inventors: Yoshiteru Nishimura, Shiojiri (JP);
Nobuyuki Mizushima, Shiojiri (JP);
Toshiyuki Kamiya, Fujimi (JP); Hiroki Kawai, Matsumoto (JP)

(73) Assignee: Seiko Epson Corporation (JP)

( * ) Notice: Subject to any disclaimer, the term of this patent is extended or adjusted under 35 U.S.C. 154(b) by 389 days.

(21) Appl. No.: 15/016,462

(22) Filed: Feb. 5, 2016

(65) Prior Publication Data
US 2016/0229067 A1 Aug. 11, 2016

(30) Foreign Application Priority Data

Feb. 9, 2015 (JP) .............................. 2015-022921
Feb. 27, 2015 (JP) .............................. 2015-037880

(51) Int. Cl.
*G01L 1/16* (2006.01)
*B25J 19/02* (2006.01)
*B25J 13/08* (2006.01)

(52) U.S. Cl.
CPC ........... *B25J 19/028* (2013.01); *B25J 13/085* (2013.01); *G01L 1/16* (2013.01); *Y10S 901/46* (2013.01)

(58) Field of Classification Search
CPC ..... G01L 1/16; G01L 1/20; G01L 1/18; G01L 9/16; B25J 9/16; B25J 19/028; B25J 13/085; B25J 13/08; Y10S 901/46
USPC .......................................... 73/862.68, 862.01
See application file for complete search history.

(56) References Cited

U.S. PATENT DOCUMENTS

| 4,821,584 | A   | * | 4/1989  | Lembke ................. B25J 19/063 |
|           |     |   |         | 310/338                              |
| 4,823,618 | A   |   | 4/1989  | Ramming                              |
| 5,821,432 | A   |   | 10/1998 | Sidler et al.                        |
| 7,703,329 | B2  | * | 4/2010  | Sekine .................. G01L 9/0073 |
|           |     |   |         | 73/754                               |
| 9,127,996 | B2  | * | 9/2015  | Kawai .................... B25J 13/085 |
| 9,481,089 | B2  | * | 11/2016 | Matsuzawa ............ B25J 9/1694    |
| 9,770,826 | B2  | * | 9/2017  | Kamiya ................. B25J 9/1694  |
| 9,931,752 | B2  | * | 4/2018  | Matsuzawa ............ B25J 9/1694    |
| 2006/0243058 | A1 |   | 11/2006 | Murakami et al.                      |
| 2013/0002095 | A1 | * | 1/2013  | Van Der Linden ... H01L 41/094       |
|           |     |   |         | 310/340                              |

(Continued)

FOREIGN PATENT DOCUMENTS

| JP | 53-070477 A | 6/1978 |
| JP | 63-078032 A | 4/1988 |
| JP | 10-068665 A | 3/1998 |

(Continued)

*Primary Examiner* — Octavia Hollington
(74) *Attorney, Agent, or Firm* — Harness, Dickey & Pierce, P.L.C.

(57) ABSTRACT

To obtain a force detection device and a robot light in weight and having excellent detection accuracy, a force detection device includes a first member, a second member joined to the first member, and a piezoelectric element joined to the second member. A material forming the first member is different from a material forming the second member. The first member is formed in a plate shape. The piezoelectric element and the second member are disposed at an end portion of the first member. A through-hole is formed in the center portion of the first member.

9 Claims, 12 Drawing Sheets

(56) References Cited

U.S. PATENT DOCUMENTS

2013/0233089 A1   9/2013   Kawai et al.

FOREIGN PATENT DOCUMENTS

| JP | 11-230836 A | 8/1999 |
| JP | 2006-308466 A | 11/2006 |
| JP | 2013-130433 A | 7/2013 |
| JP | 2013-186030 A | 9/2013 |
| JP | 2013-217876 A | 10/2013 |
| JP | 2013-245937 A | 12/2013 |

* cited by examiner

FORCE DETECTION DEVICE AND ROBOT

BACKGROUND

1. Technical Field

The present invention relates to a force detection device and a robot.

2. Related Art

In recent years, industrial robots have been introduced into production facilities such as factories for the purpose of improvement of production efficiency. Such an industrial robot includes an arm that can be driven with respect to one axis or plural axis directions and an end effector such as a hand, an instrument for component inspection, or an instrument for component conveyance attached to the arm distal end side. The industrial robot can execute component manufacturing work such as component assembling work and component machining work, component conveyance work, and component inspection work.

In the industrial robot, a force detection device (a force sensor) is provided between the arm and the end effector. Since the force detection device is provided at the distal end portion of the arm, the weight of the force detection device occupies a part of weight that carried by the robot (a weight capacity). Therefore, the force detection device is desirably light in weight.

JP-A-2013-130433 (Patent Literature 1) describes a force detection device including a first plate, a second plate disposed a predetermined space apart from the first plate and opposed to the first plate, and a sensor element (a piezoelectric element) disposed between the first plate and the second plate. The first plate includes, in the center portion thereof, a first pressing section projecting toward the second plate. The second plate includes, in the center portion thereof, a second pressing section projecting toward the first plate. The sensor element is sandwiched by the first pressing section and the second pressing section. When an external force is applied to at least one of the first plate and the second plate, the sensor element can detect the external force by outputting electric charge corresponding to the external force. The first plate including the first pressing section and the second plate including the second pressing section are integrally formed of stainless steel or the like having a relatively small coefficient of linear expansion. Therefore, it is possible to reduce the influence of thermal expansion of the first plate and the second plate. It is possible to improve detection accuracy of the force detection device.

In the force sensor in the past, a wire is drawn out from the outer circumferential portion of the force sensor (see, for example, JP-A-10-68665 (Patent Literature 2)).

In the force sensor in the past, for communication between the force sensor and the arm of the robot and power supply from the arm to the force sensor, the wire drawn out from the outer circumferential portion of the force sensor is connected to the arm.

However, in the force detection device described in Patent Literature 1, the entire first plate and the entire second plate are formed of the stainless steel. The stainless steel has a small coefficient of linear expansion but has relatively large density. Therefore, the weight of the stainless steel is large.

Note that the detection accuracy of the force detection device has to be maintained high. Therefore, for a reduction in weight, a material having small density cannot simply selected as a material forming the first plate and a material forming the second plate.

In the force sensor described in Patent Literature 2, since the wire is drawn out from the outer circumferential portion of the force sensor, when the arm moves, tension, bend, twist, and the like occur. An unnecessary force is applied to the force sensor. As a result, an error occurs with respect to a force originally desired to be detected and the detection accuracy is deteriorated.

SUMMARY

An advantage of some aspects of the invention is to solve at least a part of the problems described above, and the invention can be implemented as the following forms or application examples.

Application Example 1

A force detection device according to this application example includes: a first member; a second member joined to the first member; and a piezoelectric element joined to the second member. A material forming the first member is different from a material forming the second member.

With this configuration, it is possible to freely select, as the material forming the first member, a material different from the material forming the second member. Similarly, it is possible to freely select, as the material forming the second member, a material different from the material forming the first member.

It is possible to realize a reduction in the weight of the force detection device by, for example, selecting, as the material forming the first member, a material having density smaller than the density of the material forming the second member.

Thermal expansion of the second member has a larger adverse effect on detection accuracy of the force detection device than thermal expansion of the first member. Therefore, by selecting, as the material forming the second member, a material having a coefficient of linear expansion smaller than the coefficient of linear expansion of the material forming the first member, when the force detection device is heated, it is possible to reduce an amount of deformation due to the thermal expansion of the second member. It is possible to suppress an unnecessary force from being applied to the piezoelectric element. Consequently, it is possible to improve the detection accuracy of the force detection device.

It is possible to increase the strength of the second member by selecting, as the material forming the second member, a material having yield strength larger than the yield strength of the material forming the first member. When the piezoelectric element is pressurized by a pressurization bolt via the second member, it is possible to suppress deformation of the second member. Consequently, it is possible to improve the detection accuracy of the force detection device.

Application Example 2

In the force detection device according to the application example, it is preferable that the first member is formed in a plate shape, the piezoelectric element and the second member are disposed at an end portion of the first member, and a through-hole is formed in the center portion of the first member.

When the force detection device is heated, the first member thermally expands and is deformed to project in the center portion thereof. However, it is possible to reduce an amount of deformation of the first member in the portion of the through-hole. It is possible to suppress an unnecessary force from being applied to the piezoelectric element. Consequently, it is possible to improve the detection accuracy of the force detection device.

Application Example 3

In the force detection device according to the application example, it is preferable that the force detection device further includes: a third member; and a fourth member joined to the third member and configured to sandwich the piezoelectric element in conjunction with the second member, and a material forming the third member is different from a material forming the fourth member.

With this configuration, it is possible to freely select, as the material forming the third member, a material different from the material forming the fourth member. Similarly, it is possible to freely select, as the material forming the fourth member, a material different from the material forming the third member.

It is possible to attain a reduction in the weight of the force detection device by, for example, selecting, as the material forming the third member, a material having density smaller than the density of the material forming the fourth member.

Thermal expansion of the fourth member has a larger adverse effect on the detection accuracy of the force detection device than thermal expansion of the third member. Therefore, by selecting, as the material forming the fourth member, a material having a coefficient of linear expansion smaller than the coefficient of linear expansion of the material forming the third member, when the force detection device is heated, it is possible to reduce an amount of deformation due to the thermal expansion of the fourth member. It is possible to suppress an unnecessary force from being applied to the piezoelectric element. Consequently, it is possible to improve the detection accuracy of the force detection device.

It is possible to increase the strength of the fourth member by selecting, as the material forming the fourth member, a material having yield strength larger than the yield strength of the material forming the third member. When the piezoelectric element is pressurized by a pressurization bolt via the fourth member, it is possible to suppress deformation of the fourth member. Consequently, it is possible to improve the detection accuracy of the force detection device.

Application Example 4

In the force detection device according to the application example, it is preferable that the third member is formed in a plate shape, the piezoelectric element and the fourth member are disposed at an end portion of the third member, and a through-hole is formed in the center portion of the third member.

When the force detection device is heated, the third member thermally expands and is deformed to project in the center portion thereof. However, it is possible to reduce an amount of deformation of the third member in the portion of the through-hole. It is possible to suppress an unnecessary force from being applied to the piezoelectric element. Consequently, it is possible to improve the detection accuracy of the force detection device.

Application Example 5

In the force detection device according to the application example, it is preferable that the material forming the second member and the material forming the fourth member are the same.

With this configuration, it is possible to reduce a difference in thermal expansion between the second member and the fourth member. It is possible to suppress an unnecessary force from being applied to the piezoelectric element.

Application Example 6

In the force detection device according to the application example, it is preferable that the material forming the first member and the material forming the third member are the same.

With this configuration, it is possible to reduce a difference in thermal expansion between the first member and the third member. It is possible to suppress an unnecessary force from being applied to the piezoelectric element.

Application Example 7

In the force detection device according to the application example, it is preferable that the density of the material forming the third member is smaller than the density of the material forming the fourth member.

With this configuration, it is possible to attain a reduction in the weight of the force detection device.

Application Example 8

In the force detection device according to the application example, it is preferable that the yield strength of the material forming the fourth member is larger than the yield strength of the material forming the third member.

With this configuration, it is possible to increase the strength of the fourth member. When the piezoelectric element is pressurized by a pressurization bolt via the fourth member, it is possible to suppress deformation of the fourth member. Consequently, it is possible to improve the detection accuracy of the force detection device.

Application Example 9

In the force detection device according to the application example, it is preferable that the coefficient of linear expansion of the material forming the fourth member is smaller than the coefficient of linear expansion of the material forming the third member.

With this configuration, when the force detection device is heated, it is possible to reduce an amount of deformation due to thermal expansion of the fourth member. It is possible to suppress an unnecessary force from being applied to the piezoelectric element. Consequently, it is possible to improve the detection accuracy of the force detection device.

Application Example 10

In the force detection device according to the application example, it is preferable that the density of the material forming the first member is smaller than the density of the material forming the second member.

With this configuration, it is possible to attain a reduction in the weight of the force detection device.

Application Example 11

In the force detection device according to the application example, it is preferable that the yield strength of the material forming the second member is larger than the yield strength of the material forming the first member.

With this configuration, it is possible to increase the strength of the second member. When the piezoelectric element is pressurized by a pressurization bolt via the second member, it is possible to suppress deformation of the second member. Consequently, it is possible to improve the detection accuracy of the force detection device.

Application Example 12

In the force detection device according to the application example, it is preferable that the coefficient of linear expansion of the material forming the second member is smaller than the coefficient of linear expansion of the material forming the first member.

With this configuration, when the force detection device is heated, it is possible to reduce an amount of deformation due to thermal expansion of the second member. It is possible to suppress an unnecessary force from being applied to the piezoelectric element. Consequently, it is possible to improve the detection accuracy of the force detection device.

Application Example 13

A robot according to this application example includes: an arm; an end effector provided in the arm; and a force detection device provided between the arm and the end effector and configured to detect an external force applied to the end effector. The force detection device includes: a first member; a second member joined to the first member; and a piezoelectric element joined to the second member. A material forming the first member is different from a material forming the second member.

With this configuration, it is possible to freely select, as the material forming the first member, a material different from the material forming the second member. Similarly, it is possible to freely select, as the material forming the second member, a material different from the material forming the first member.

It is possible to realize a reduction in the weight of the force detection device by, for example, selecting, as the material forming the first member, a material having density smaller than the density of the material forming the second member.

Thermal expansion of the second member has a larger adverse effect on detection accuracy of the force detection device than thermal expansion of the first member. Therefore, by selecting, as the material forming the second member, a material having a coefficient of linear expansion smaller than the coefficient of linear expansion of the material forming the first member, when the force detection device is heated, it is possible to reduce an amount of deformation due to the thermal expansion of the second member. It is possible to suppress an unnecessary force from being applied to the piezoelectric element. Consequently, it is possible to improve the detection accuracy of the force detection device.

It is possible to increase the strength of the second member by selecting, as the material forming the second member, a material having yield strength larger than the yield strength of the material forming the first member. When the piezoelectric element is pressurized by a pressurization bolt via the second member, it is possible to suppress deformation of the second member. Consequently, it is possible to improve the detection accuracy of the force detection device.

Application Example 14

A force detection device according to this application example includes: a first base including a first opening; a second base including a second opening; a plurality of force detection elements disposed between the first base and the second base; an inner bore section in which an inner bore is formed between the first opening and the second opening; and a wire body disposed in the inner bore section.

With this configuration, when a target object set as a detection target by the force detection device moves, it is possible to suppress tension, bend, twist, and the like from occurring in the wire body. It is possible to suppress an unnecessary force from being applied to the force detection device. Consequently, it is possible to improve the detection accuracy of the force detection device.

Application Example 15

In the force detection device according to the application example, it is preferable that the force detection device further includes: an inner bore wall forming the inner bore section; and a through-hole through which a part of the wire body passes piercing through the inner bore wall.

With this configuration, the wire body can be inserted through the through-hole and pass through the inner bore wall. Therefore, a part of the wire body can be drawn around only on the inside of the force detection device without being exposed to the outside of the force detection device. Therefore, it is possible to suppress tension, bend, twist, and the like from occurring in the wire body disposed in the force detection elements or the like. It is possible to suppress an unnecessary force from being applied to the force detection device. Consequently, it is possible to improve the detection accuracy of the force detection device.

Application Example 16

In the force detection device according to the application example, it is preferable that the wire body is movably disposed in the inner bore section.

With this configuration, when a target object set as a detection target by the force detection device moves, it is possible to reduce tension, bend, twist, and the like that occur in the wire body. It is possible to suppress an unnecessary force from being applied to the force detection device. Consequently, it is possible to improve the detection accuracy of the force detection device.

Application Example 17

In the force detection device according to the application example, it is preferable that the wire body is at least one of an electric wire in which electric power or a signal flows and a pipe in which gas flows.

With this configuration, it is possible to suppress tension, bend, twist, and the like from occurring in the electric wire in which electric power or a signal flows or the pipe in which gas flows. It is possible to suppress an unnecessary force from being applied to the force detection device. Consequently, it is possible to improve the detection accuracy of the force detection device.

Application Example 18

In the force detection device according to the application example, it is preferable that the first opening is disposed in the center of a first attachment surface of the first base, and the second opening is disposed in the center of the second attachment surface of the second base.

With this configuration, when a target object set as a detection target by the force detection device moves, it is possible to further reduce tension, bend, twist, and the like occurring in the wire body. The first attachment surface of the first base and the second attachment surface of the second base are surfaces used when the force detection device is attached to a part of an external apparatus or an external device. If the openings are provided in the center portions of the surfaces, it is possible to reduce the influence of tension, bend, twist, and the like on the wire body due to a positional relation between the force detection device and a part of the external apparatus or the external device.

Application Example 19

A robot according to this application example includes: an arm; an end effector provided in the arm; a force detection device provided between the arm and the end effector; and a wire body disposed from the arm to the force detection device. The force detection device includes: a first base including a first opening; a second base including a second opening; a plurality of force detection elements disposed between the first base and the second base; an inner bore section in which an inner bore is formed between the first opening and the second opening; and the wire body disposed in the inner bore section.

With this configuration, when the arm of the robot moves, it is possible to suppress tension, bend, twist, and the like from occurring in the wire body. It is possible to suppress an unnecessary force from being applied to the force detection device. Consequently, it is possible to improve the detection accuracy of the force detection device. It is possible to control the robot at higher accuracy.

Application Example 20

In the robot according to the application example, it is preferable that the robot further includes: an inner bore wall forming the inner bore section; and a through-hole through which a part of the wire body passes piercing through the inner bore wall.

With this configuration, the wire body can be inserted through the through-hole and pass through the inner bore wall. Therefore, a part of the wire body can be drawn around only on the inside of the force detection device without being exposed to the outside of the force detection device. Therefore, during the operation of the arm of the robot, it is possible to suppress tension, bend, twist, and the like from occurring in the wire body disposed in the force detection elements or the like. It is possible to suppress an unnecessary force from being applied to the force detection device. Consequently, it is possible to improve the detection accuracy of the force detection device. It is possible to control the robot at higher accuracy.

Application Example 21

In the robot according to the application example, it is preferable that the wire body is movably disposed in the inner bore section.

With this configuration, when the arm of the robot moves, it is possible to reduce tension, bend, twist, and the like that occur in the wire body. It is possible to suppress an unnecessary force from being applied to the force detection device. Consequently, it is possible to improve the detection accuracy of the force detection device. It is possible to control the robot at higher accuracy.

Application Example 22

In the robot according to the application example, it is preferable that the wire body is at least one of an electric wire in which electric power or a signal flows and a pipe in which gas flows.

With this configuration, it is possible to suppress tension, bend, twist, and the like from occurring in the electric wire in which electric power or a signal flows or the pipe in which gas flows. It is possible to suppress an unnecessary force from being applied to the force detection device. Consequently, it is possible to improve the detection accuracy of the force detection device. It is possible to control the robot at higher accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention are explained in detail below with reference to the accompanying drawings.

First Embodiment

Force Detection Device

Figure 1:
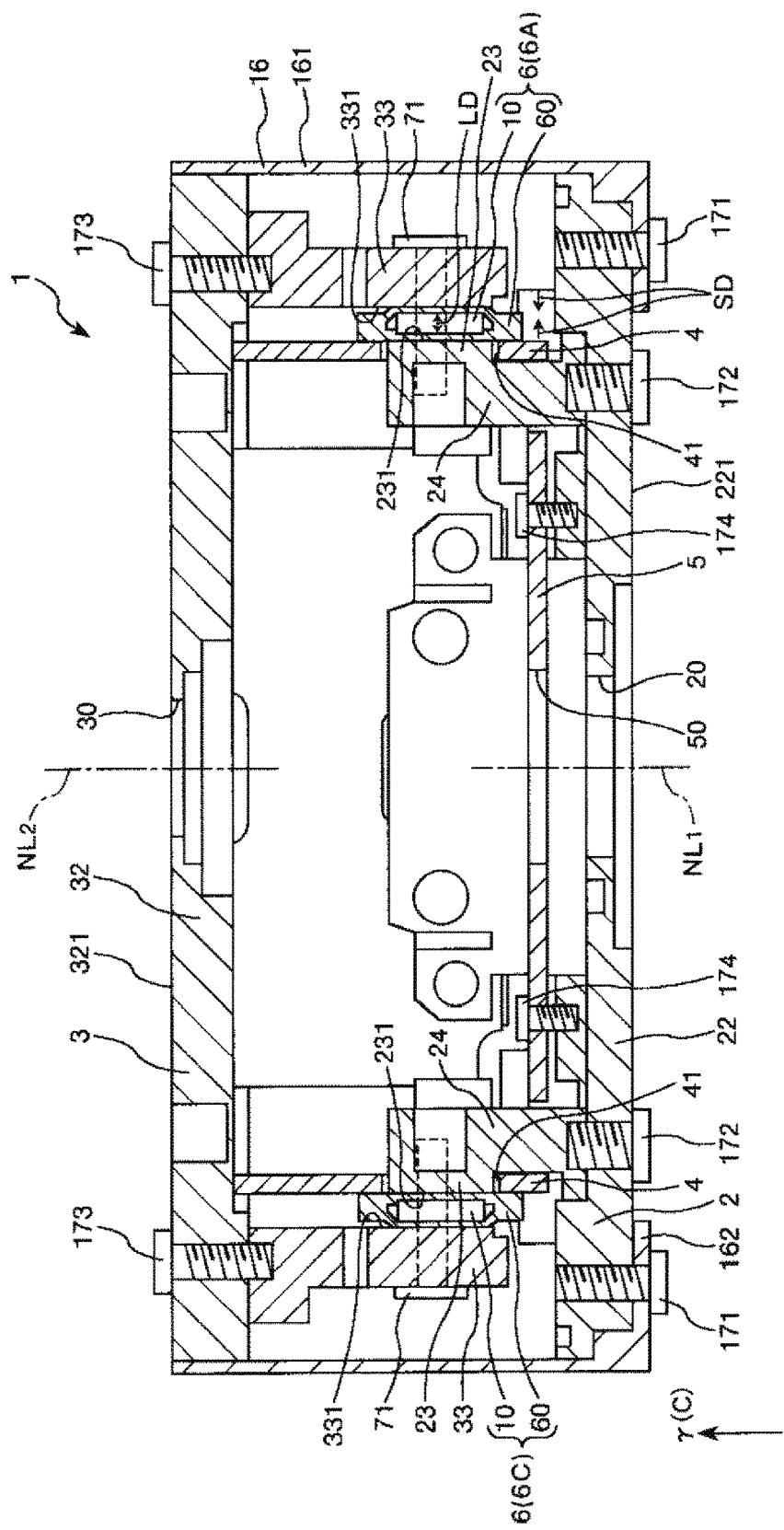
FIG. 1 is a sectional view showing a force detection device according to a first embodiment.
Figure 2:
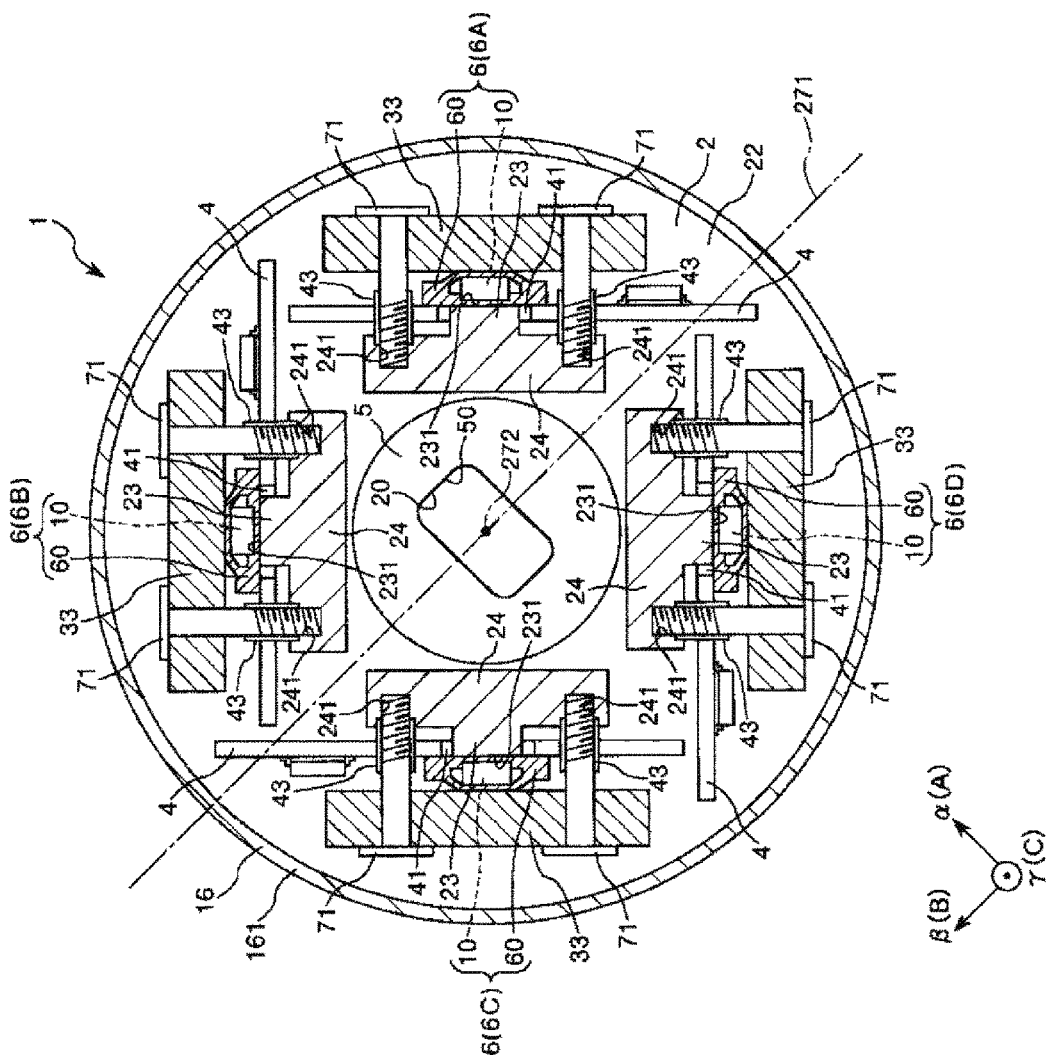
FIG. 2 is a sectional view of the force detection device shown in FIG. 1.
Figure 3:
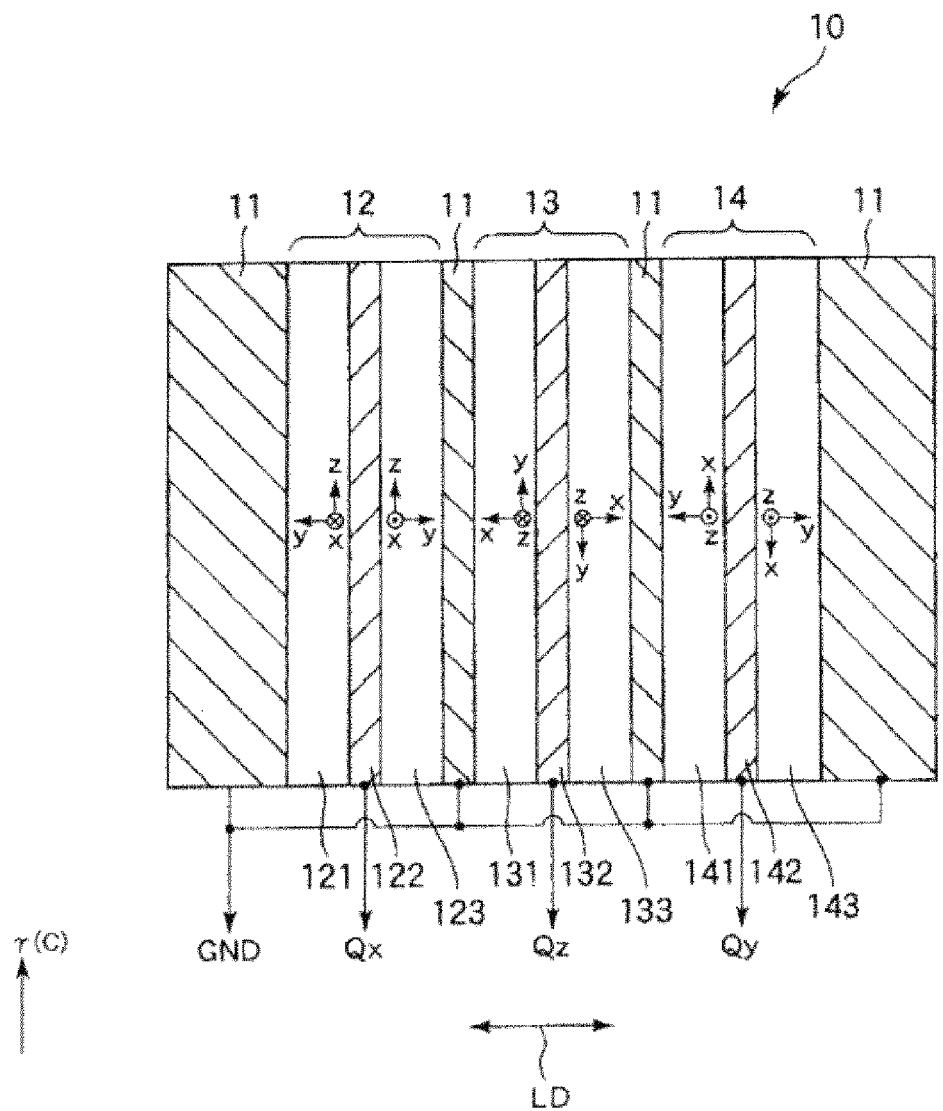
FIG. 3 is a sectional view schematically showing a charge output element of the force detection device shown in FIG. 1.
Figure 4:
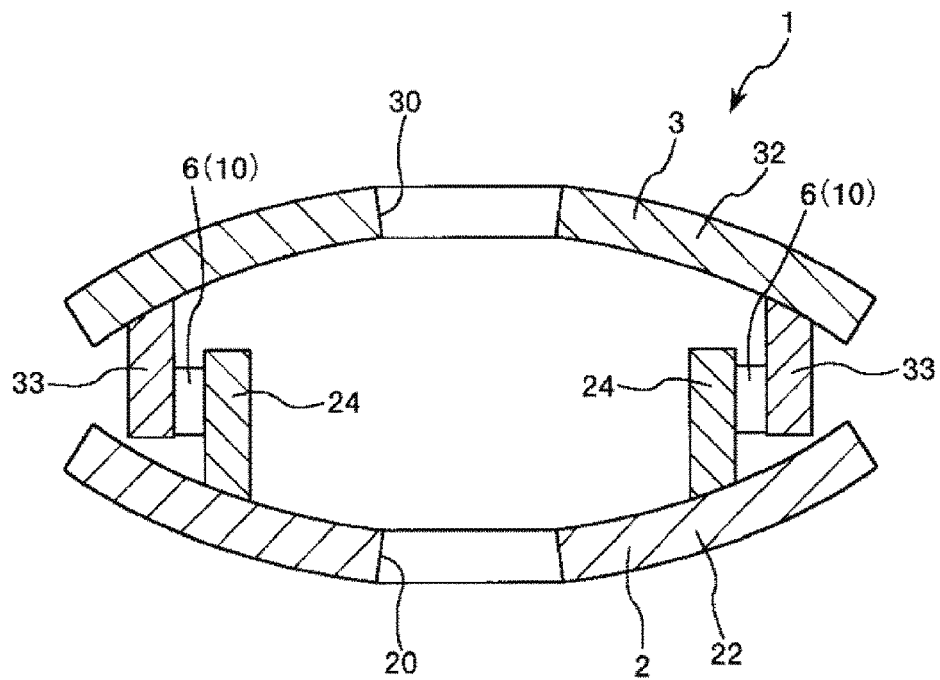
FIG. 4 is a diagram schematically showing a state in which the force detection device shown in FIG. 1 is heated.
Figure 5:
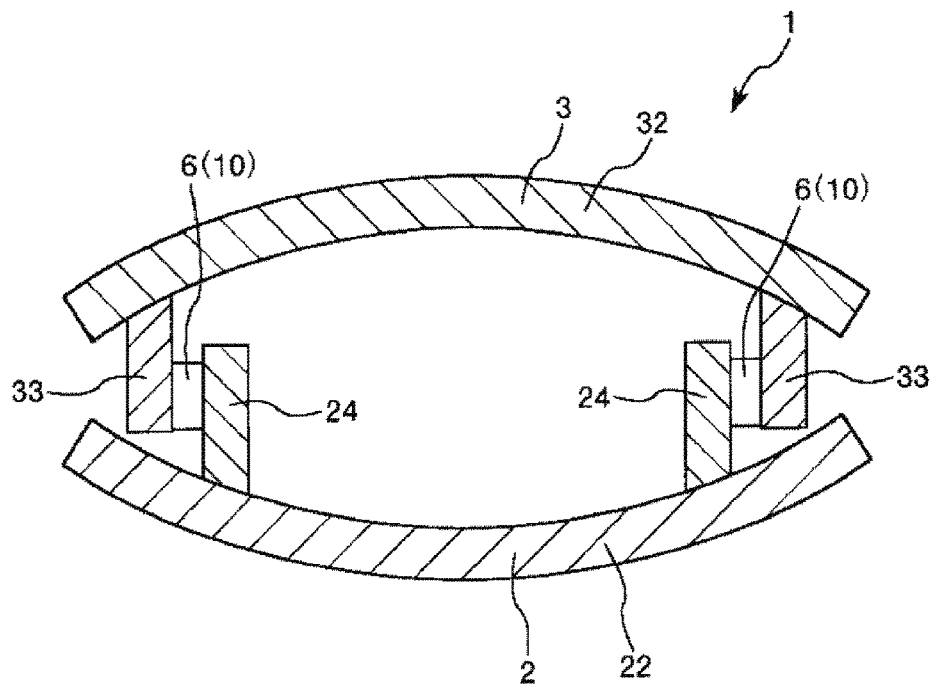
FIG. 5 is a diagram schematically showing a state in which the force detection device shown in FIG. 1 with a through-hole not formed in a first member of a first base and a third member of a second base is heated.

FIG. 1 is a sectional view showing a force detection device according to a first embodiment. FIG. 2 is a sectional view of the force detection device shown in FIG. 1. FIG. 3 is a sectional view schematically showing a charge output element of the force detection device shown in FIG. 1. FIG. 4 is a diagram schematically showing a state in which the force detection device shown in FIG. 1 is heated. FIG. 5 is a diagram schematically showing a state in which the force detection device shown in FIG. 1 with a through-hole not formed in a first member of a first base and a third member of a second base is heated.

Note that, in the following explanation, the upper side in FIG. 1 is referred to as "upper" or "upward" and the lower side in FIG. 1 is referred to as "lower" or "downward".

In FIG. 2, an α axis, a β axis, and a γ axis are shown as three axes orthogonal to one another. In FIGS. 1 and 3, among the three axes, only the γ axis is shown. A direction parallel to the α (A) axis is referred to as "α (A)-axis direction" or "α direction", a direction parallel to the β (B) axis is referred to as "β (B)-axis direction" or "β direction", and a direction parallel to the γ (C) axis is referred to as "γ (C)-axis direction" or "γ direction". A plane defined by the α axis and the β axis is referred to as "αβ plane", a plane defined by the β axis and the γ axis is referred to as "βγ plane", and a plane defined by the α axis and the γ axis is referred to as "αγ plane". In the α direction, the β direction, and the γ direction, an arrow distal end side is set as a "+ (plus) side" and an arrow proximal end side is set as a "− (minus) side".

A force detection device 1 shown in FIG. 1 has a function of detecting an external force applied to the force detection device 1, that is, a six-axis force (translation force components in the α, β, and γ-axis directions and rotating force components around the α, β, and γ axes).

The force detection device 1 includes a first base 2, a second base 3 disposed a predetermined space apart from the first base 2 and opposed to the first base 2, a sidewall section 16 provided the outer circumferential portions of the first base 2 and the second base 3, four analog circuit boards 4 housed (provided) between the first base 2 and the second base 3, a digital circuit board 5 housed (provided) between the first base 2 and the second base 3 and electrically connected to the analog circuit boards 4, four sensor devices (pressure detecting sections) 6 respectively mounted on the analog circuit boards 4 and including charge output elements (piezoelectric elements) 10, which are elements that output signals (electric charges) according to a received external force, and packages (housing sections) 60 that house the charge output elements 10, and eight pressurization bolts (fixing members) 71.

The configurations of the sections of the force detection device 1 are explained in detail below.

Note that, in the following explanation, as shown in FIG. 2, among the four sensor devices 6, the sensor device 6 located on the right side in FIG. 2 is referred to as "sensor device 6A" and the other sensor devices 6 are referred to as "sensor device 6B", "sensor device 6C", and "sensor device 6D" in order in the counterclockwise direction. When the sensor devices 6A, 6B, 6C, and 6D are not distinguished, the sensor devices 6A, 6B, 6C, and 6D are referred to as "sensor devices 6".

As shown in FIG. 1, the first base (a base plate) 2 includes a first member (a bottom plate) 22 formed in a plate shape and four second members (wall sections) 24 provided on an upper surface of an end portion of the first member 22 and projecting upward from the upper surface. A plane shape (a shape viewed from the thickness direction) of the first member 22 (the first base 2) is formed in a circular shape. Note that the plane shape of the first member 22 is not limited to the plane shape shown in the figure. Examples of the plane shape include quadrangles such as a square and a rectangle, polygons such as a pentagon and a hexagon, and an ellipse.

In an example in which the force detection device 1 is provided between an arm and an end effector of a robot and used as a force sensor that detects an external force applied to the end effector, a lower surface 221 of the first base 2 functions as an attachment surface (a first attachment surface) to the arm (a target object) of the robot.

The second members 24 are fixed (joined) to the first member 22. A fixing method of the second members 24 is not particularly limited. In the configuration shown in the figure, the second members 24 are fixed to the first member 22 respectively by a plurality of screws 172.

Projections 23 are respectively projected and formed on outward surfaces of the second members 24. Each of the wall section 24 is formed in an "L" shape. The projections 23 are respectively projected and formed on two outward surfaces of the wall section 24. Top surfaces (first surfaces) 231 of the projections 23 are respectively planes perpendicular to the first member 22. In each of the second members 24, two female screws 241 screwing with the pressurization bolts 71 explained below are provided. Female screws 241 that screw with the pressurization bolts 71 are provided in the projections 23 (see FIG. 2).

As shown in FIG. 1, the second base (a cover plate) 3 is disposed to be opposed to the first base 2 a predetermined space apart from the first base 2.

Like the first base 2, the second base 3 is formed in a plate shape. The second base 3 includes a third member (a top plate) 32 formed in a plate shape and four fourth members (wall sections) 33 provided on a lower surface of an end portion of the third member 32 and projecting downward from the lower surface. A plane shape of the third member 32 (the second base 3) is not particularly limited. However, the plane shape is desirably a shape corresponding to the plane shape of the first member 22 (the first base 2). In this embodiment, like the plane shape of the first member 22, the plane shape of the third member 32 is formed in a circular shape. The third member 32 desirably has a size same as the size of the first member 22 or a size enough for including the first member 22.

In an example in which the force detection device 1 is used as a force sensor of the robot, an upper surface (a second surface) 321 of the second base 3 functions as an attachment surface (a second attachment surface) to an end effector (a target object) mounted on an arm of the robot. The upper surface 321 of the second base 3 and the lower surface 221 of the first base 2 are parallel in a natural state in which an external force is not applied thereto.

The fourth members 33 are fixed (joined) to the third member 32. A fixing method of the fourth members 33 is not particularly limited. In the configuration shown in the figure, the fourth members 33 are fixed to the third member 32 respectively by a plurality of screws 173.

Inner wall surfaces (second surfaces) 331 of the fourth members 33 are respectively planes perpendicular to the third member 32. The sensor devices 6 are respectively provided between the top surfaces 231 of the second members 24 and the inner wall surfaces 331 of the fourth members 33.

The first base 2 and the second base 3 are connected and fixed by the eight pressurization bolts 71. That is, each of the second members 24 and each of the fourth members 33 are connected and fixed by two pressurization bolts 71. As shown in FIG. 2, there are the eight (a plurality of) pressurization bolts 71. Two of the eight pressurization bolts 71 are disposed on both sides of each of the sensor devices 6. Note that the number of pressurization bolts 71 with respect to one sensor device 6 is not limited to two and may be, for example, three or more.

A constituent material of the pressurization bolts 71 is not particularly limited. For example, various resin materials, various metal materials, and the like can be used.

A housing space for housing the sensor devices 6A to 6D, the analog circuit boards 4, and the digital circuit board 5 is formed by the first base 2 and the second base 3 connected by the pressurization bolts 71. The housing space has, for example, a sectional shape of a circular shape or a round corner square shape.

As shown in FIGS. 1 and 2, the sidewall section 16 is provided on the outer circumferential portions of the first base 2 and the second base 3. Consequently, in the outer circumferential portions of the first base 2 and the second base 3, a space between the first base 2 and the second base 3 can be sealed. It is possible to suppress dust and the like from intruding into the space between the first base 2 and the second base 3.

The sidewall section 16 includes a cylindrical section 161 formed in a cylindrical shape and a flange 162 formed on the side surface on the inner circumference side of the proximal end section (the lower end section) of the cylindrical section 161. An internal shape and an external shape of the cylindrical section 161 viewed from the thickness direction of the first base 2 and the second base 3 are respectively shapes corresponding to the plane shapes of the first base 2 and the second base 3. In the configuration shown in the figure, the internal shape and the external shape are formed in circular shapes.

The proximal end portion of the sidewall section 16, that is, the flange 162 is fixed to the first base 2. A fixing method of the sidewall section 16 is not particularly limited. However, in the configuration shown in the figure, the flange 162 is fixed to the first member 22 of the first base 2 by a plurality of screws 171.

As shown in FIG. 1, the analog circuit boards 4 electrically connected to the sensor devices 6 are provided between the first base 2 and the second base 3.

In parts of the analog circuit boards 4 where the sensor devices 6 (specifically, the charge output elements 10) are disposed, holes 41 into which the projections 23 of the first base 2 are inserted are formed. The holes 41 are through-holes through which the analog circuit boards 4 are pierced.

As shown in FIG. 2, through-holes through which the pressurization bolts 71 are inserted are provided in the analog circuit boards 4. Pipes 43 formed of an insulating material such as a resin material are fixed, for example, by fitting, to portions (the through-holes) through which the pressurization bolts 71 of the analog circuit boards 4 are pierced.

As shown in FIG. 1, between the first base 2 and the second base 3, the digital circuit board 5 electrically connected to the analog circuit boards 4 is provided in a position different from the positions where the analog circuit boards 4 are provided on the first base 2. The digital circuit board 5 is disposed to be parallel to the first member 22 of the first base 2 and the third member 32 of the second base 3. Note that the position of the digital circuit board 5 in the thickness direction of the first base 2 and the second base 3 is not particularly limited as long as the position is between the first base 2 and the second base 3. For example, the position may be the vicinity of the first base 2 as shown in FIG. 1, may be the vicinity of the second base 3, or may be a position (the center portion) in the middle of the first base 2 and the second base 3. The digital circuit board 5 is fixed to the first member 22. A fixing method of the digital circuit board 5 is not particularly limited. However, in the configuration shown in the figure, the digital circuit board 5 is fixed to the first member 22 by a plurality of screws 174.

Note that constituent materials of parts other than the elements and the wires of the first base 2, the second base 3, and the analog circuit boards 4 and parts other than the elements and the wires of the digital circuit board 5 are not particularly limited. For example, various resin materials, various metal materials, and the like can be used.

As explained above, in the first base 2, the first member 22 and the second members 24 are configured by the separate members. Similarly, in the second base 3, the third member 32 and the fourth members 33 are configured by the separate members. The material forming the first member 22 and the material forming the second members 24 are different. Similarly, the material forming the third member 32 and the material forming the fourth members 33 are different.

The densities, the yield strengths, and the coefficients of linear expansion of the first member 22, the third member 32, the second members 24, and the fourth members 33 are explained below.

The yield strengths of the materials forming the second members 24 and the fourth members 33 are desirably larger and, specifically, desirably 800 Mpa or more, more desirably 900 Mpa or more, and still more desirably 900 Mpa or more and 2000 Mpa or less. The yield strengths are measured according to "JISZ2241 (a metal material tensile test method)".

By setting the yield strength large, the strength of the second members 24 and the fourth members 33 can be increased. When the second members 24 and the fourth members 33 are connected and fixed by the pressurization bolts 71 to pressurize the charge output element 10, it is possible to suppress deformation of the second members 24 and the fourth members 33. Consequently, it is possible to improve detection accuracy of the force detection device 1.

However, if the yield strengths are smaller than the lower limit value, depending on the other conditions, it is likely that the strength of the second members 24 and the fourth members 33 is insufficient.

The densities of the materials forming the second members 24 and the fourth members 33 are desirably smaller. When it is taken into account that the yield strengths are set to values within the suitable range, the densities are desirably 10 $g/cm^3$ or less, more desirably 8 $g/cm^3$ or less, and still more desirably 5 $g/cm^3$ or more and 8 $g/cm^3$ or less.

The volumes of the second members 24 and the fourth members 33 are smaller than the volumes of the first member 22 and the third member 32. Therefore, even if the densities of the materials are relatively large, there is almost no influence in attaining a reduction in weight. However, if the densities are larger than the upper limit value, it is likely that the reduction in weight cannot be attained depending on the other conditions.

The coefficients of linear expansion of the materials forming the second members 24 and the fourth members 33 are desirably smaller. When it is taken into account that the yield strengths are set to values within the suitable range, the coefficients of linear expansion are desirably $20 \times 10^{-6}$/K or less, more desirably $15 \times 10^{-6}$/K or less, and still more desirably $5 \times 10^{-6}$/K or more and $15 \times 10^{-6}$/K or less.

By setting the coefficients of linear expansion small, when the force detection device 1 is heated, it is possible to reduce amounts of deformation due to thermal expansion of the second members 24 and the fourth members 33. It is possible to suppress an unnecessary force from being applied to the charge output elements 10. Consequently, it is possible to improve the detection accuracy of the force detection device 1.

However, if the coefficients of linear expansion are larger than the upper limit value, depending on the other conditions, it is likely that the detection accuracy of the force detection device 1 is deteriorated.

The densities of the materials forming the first member 22 and the third member 32 are desirably smaller. The densities are desirably 6 g/cm$^3$ or less, more desirably 4 g/cm$^3$ or less, and still more desirably 0.5 g/cm$^3$ or more and 4 g/cm$^3$ or less.

By setting the densities small, it is possible to attain a reduction in weight. The volumes of the first member 22 and the third member 32 are larger than the volumes of the second members 24 and the fourth members 33. Therefore, it is possible to attain a considerable reduction in weight.

However, if the densities are larger than the upper limit value, depending on the other conditions, it is likely that a reduction in weight cannot be attained.

The yield strengths of the materials forming the first member 22 and the third member 32 are desirably larger and, when it is taken into account that the densities are set to values in the suitable range, desirably 200 Mpa or more, more desirably 400 Mpa or more, and still more desirably 400 Mpa or more and 900 Mpa or less.

The first member 22 and the third member 32 are not parts fixed by the pressurization bolts 71. Therefore, a problem hardly occurs even if the yield strengths of the materials are relatively small. However, if the yield strengths are smaller than the lower limit value, depending on the other conditions, it is likely that the strength is insufficient.

The coefficients of linear expansion of the materials forming the first member 22 and the third member 32 are desirably smaller. When it is taken into account that the densities are set to values within the suitable range, the coefficients of linear expansion are desirably $30 \times 10^{-6}$/K or less, more desirably $26 \times 10^{-6}$/K or less, and still more desirably $15 \times 10^{-6}$/K or more and $26 \times 10^{-6}$/K or less.

The first member 22 and the third member 32 are not in contact with the sensor devices 6. Therefore, influence due to thermal expansion is small compared with the second members 24 and the fourth members 33. However, if the coefficients of linear expansion are larger than the upper limit value, depending on the other conditions, it is likely that the detection accuracy of the force detection device 1 is deteriorated.

The yield strengths of the materials forming the second members 24 and the fourth members 33 are respectively desirably larger than the yield strengths of the materials forming the first member 22 and the third member 32.

When the yield strengths of the materials forming the first member 22 and the third member 32 are represented as A1 and the yield strengths of the materials forming the second members 24 and the fourth members 33 are represented as A2, a ratio A2/A1 of A2 and A1 is desirably 1.2 or more, more desirably 1.2 or more and 10 or less, and still more desirably 1.8 or more and 5 or less.

Consequently, it is possible to set the strengths of the second members 24 and the fourth members 33 higher than the strengths of the first member 22 and the third member 32. When the second members 24 and the fourth members 33 are connected and fixed by the pressurization bolts 71 to pressurize the charge output elements 10, it is possible to suppress deformation of the second members 24 and the fourth members 33. Consequently, it is possible to improve the detection accuracy of the force detection device 1.

However, if A2/A1 is smaller than the lower limit value, depending on the other conditions, it is likely that the strength of the second members 24 and the fourth members 33 is insufficient.

The densities of the materials forming the first member 22 and the third member 32 are respectively desirably smaller than the densities of the materials forming the second members 24 and the fourth members 33.

When the densities of the materials forming the first member 22 and the third member 32 are represented as B1 and the densities of the materials forming the second members 24 and the fourth members 33 are represented as B2, a ratio B1/B2 of B1 and B2 is desirably 0.7 or less, more desirably 0.1 or more and 0.7 or less, and still more desirably 0.1 or more and 0.4 or less.

The volumes of the first member 22 and the third member 32 are larger than the volumes of the second members 24 and the fourth members 33. Therefore, it is possible to attain a reduction in weight.

However, if B1/B2 is larger than the upper limit value, depending on the other conditions, it is likely that a reduction in weight cannot be attained.

The coefficients of linear expansion of the materials forming the second members 24 and the fourth members 33 are respectively desirably smaller than the coefficients of linear expansion of the materials forming the first member 22 and the third member 32.

Specifically, when the coefficients of linear expansion of the materials forming the first member 22 and the third member 32 are represented as C1 and the coefficients of linear expansion of the materials forming the second members 24 and the fourth members 33 are represented as C2, a ratio C2/C1 of the C2 and C1 is desirably 0.6 or less, more desirably 0.1 or more and 0.6 or less, and still more desirably 0.1 or more and 0.5 or less.

Consequently, when the force detection device 1 is heated, it is possible to reduce an amount of deformation due to thermal expansion of the second members 24 and the fourth members 33, which are members in contact with the sensor devices 6. It is possible to suppress an unnecessary force from being applied to the charge output element 10. Consequently, it is possible to improve the detection accuracy of the force detection device 1.

However, if C2/C1 is larger than the upper limit value, depending on the other conditions, it is likely that the detection accuracy of the force detection device 1 is deteriorated.

The materials forming the first member 22 and the third member 32 are respectively desirably materials having the characteristics explained above. Examples of the materials include aluminum alloys such as A7075-T6 (manufactured by Toho Hitetsu-Kinzoku Co., Ltd.) and A7075-T651 (manufactured by Toho Hitetsu-Kinzoku Co., Ltd.), titanium alloys such as DAT51 (manufactured by Daido Steel Co., Ltd.), and magnesium alloys such as AZ91 (manufactured by Sumitomo Electric Industries, Ltd.). Among these materials, for example, the aluminum alloys such as A7075-T6 and A7075-T651 are desirable.

Note that the density of A7075-T6 and A7075-T651 is 2.7 g/cm$^3$, the yield strength thereof is 505 Mpa, and the coefficient of linear expansion thereof is $24 \times 10^{-6}$/K. The density of DAT51 is 4.69 g/cm$^3$, the yield strength thereof is 825 Mpa, and the coefficient of linear expansion thereof is $8 \times 10^{-6}$/K. The density of AZ91 is 1.8 g/cm$^3$, the yield strength thereof is 280 Mpa, and the coefficient of linear expansion is $27.2 \times 10^{-6}$/K.

The materials forming the second members 24 and the fourth members 33 are respectively desirably materials having the characteristics explained above. Examples of the materials include alloy steel such as NAK55 (manufactured by Daido Steel, Co., Ltd.).

Note that the density of NAK55 is 7.8 g/cm$^3$, the yield strength thereof is 1000 Mpa, and the coefficient of linear expansion thereof is $11.3 \times 10^{-6}$/K.

The material forming the first member 22 and the material forming the third member 32 may be the same or may be different. However, the materials are desirably the same. By using the same material, it is possible to reduce a difference in thermal expansion between the first member 22 and the third member 32. It is possible to suppress an unnecessary force from being applied to the charge output element 10.

Similarly, the material forming the second members 24 and the material forming the fourth members 33 may be the same or may be different. However, the materials are desirably the same. By using the same material, it is possible to reduce a difference in thermal expansion between the second members 24 and the fourth members 33. It is possible to suppress an unnecessary force from being applied to the charge output element 10.

A through-hole 20 is formed in the center portion of the first member 22 of the first base 2. Similarly, a through-hole 30 is formed in the center portion of the third member 32 of the second base 3. Similarly, a through-hole 50 is formed in the center portion of the digital circuit substrate 5.

As shown in FIG. 5, if the through-holes 20 and 30 are not formed in the first member 22 of the first base 2 and the third member 32 of the second base 3, when the force detection device 1 is heated, the first member 22 and the third member 32 thermally expand and warp to separate in the center portions thereof. This is because, since the second members 24 and the fourth members 33 are provided at the end portions of the first member 22 and the third member 32, strength is lower in the center portions than at the end portions.

On the other hand, if the through-holes 20 and 30 are formed in the first member 22 of the first base 2 and the third member 32 of the second base 3, when the first member 22 and the third member 32 thermally expand and warp, it is possible to reduce an amount of deformation of the first member 22 in the portion of the through-hole 20. Similarly, it is possible to reduce an amount of deformation of the third member 32 in the portion of the through-hole 30. The warp of the first member 22 is reduced by the through-hole 20. Similarly, the warp of the third member 32 is reduced by the through-hole 30. Consequently, it is possible to suppress an unnecessary force from being applied to the charge output element 10. It is possible to improve the detection accuracy of the force detection device 1.

The through-holes 20, 30, and 50 are disposed in the same position one another when viewed from the thickness direction of the first member 22, the third member 32, and the digital circuit board 5. Note that the positions of the through-holes 20, 30, and 50 are not limited to this. The through-holes 20, 30, and 50 may be disposed in different positions.

The plane shapes (shapes viewed from the thickness direction) of the through-holes 20, 30, and 50 are respectively formed in square shapes. Note that the plane shapes of the through-holes 20, 30, and 50 are not limited to the shapes shown in the figure. Examples of the plane shapes include other polygons such as a pentagon and hexagon, a circle, and an ellipse.

The plane shapes of the through-holes 20, 30, and 50 may be the same or may be different.

Note that the first base 2 and the second base 3 are respectively formed by members formed in plate shapes. However, the first base 2 and the second base 3 are not limited to this. For example, one of the first base 2 and the second base 3 may be formed by a member formed in a plate shape and the other may be formed by a member formed in a block shape.

The sensor devices 6 are explained.

Sensor Devices

As shown in FIGS. 1 and 2, the sensor device 6A is sandwiched by the top surface 231 of one projection 23 among the four projections 23 of the first base 2 and the inner wall surface 331 opposed to the top surface 231. Similar to the sensor device 6A, the sensor device 613 is sandwiched by the top surface 231 of one projection 23 different from the projection 23 explained above and the inner wall surface 331 opposed to the top surface 231. The sensor device 6C is sandwiched by the top surface 231 of one projection 23 different from the projections 23 explained above and an inner wall surface 331 opposed to the top surface 231. Further, the sensor device 6D is sandwiched by the top surface 231 of the projection 23 different from the projections 23 explained above and the inner wall surface 331 opposed to the top surface 231. Note that the charge output elements 10 of the sensor devices 6A, 6B, 6C, and 6D can also be considered to be respectively joined to the second members 24 and the fourth members 33.

In the following explanation, a direction in which the sensor devices 6A to 6D are sandwiched by the first base 2 and the second base 3 is referred to as "sandwiching direction SD". In some case, a direction in which the sensor device 6A among the sensor devices 6A to 6D is sandwiched is referred to as first sandwiching direction, a direction in which the sensor device 613 is sandwiched is sometimes referred to as second sandwiching direction, a direction in which the sensor device 6C is sandwiched is referred to as third sandwiching direction, and a direction in which the sensor device 6D is sandwiched is referred to as fourth sandwiching direction.

Note that, in this embodiment, as shown in FIG. 1, the sensor devices 6 are provided on the second base 3 (the fourth members 33) side of the analog circuit boards 4. However, the sensor devices 6 may be provided on the first base 2 side of the analog circuit boards 4.

As shown in FIG. 2, the sensor device 6A and the sensor device 6B are symmetrically disposed and the sensor device 6C and the sensor device 6D are symmetrically disposed with respect to a center axis 271 extending along the β axis of the first base 2. That is, the sensor devices 6A to 6D are disposed at an equal angle interval around a center 272 of the first base 2. By disposing the sensor devices 6A to 6D in this way, it is possible to uniformly detect an external force.

Note that the disposition of the sensor devices 6A to 6D is not limited to the disposition shown in the figure. However, the sensor devices 6A to 6D are desirably disposed in positions spaced apart from the center portion (the center 272) of the second base 3 as much as possible when viewed from the upper surface 321 of the second base 3. Consequently, it is possible to stably detect an external force applied to the force detection device 1.

In this embodiment, the sensor devices 6A to 6D are mounted in a state in which all of the sensor devices 6A to 6D are directed to the same direction. However, the directions of the sensor devices 6A to 6D may be different from one another.

The sensor devices 6 disposed in this way include, as shown in FIG. 1, the charge output elements 10 and the packages 60 that house the charge output elements 10. In this embodiment, the sensor devices 6A to 6D have the same configuration. Note that the packages 60 may be omitted.

The charge output elements 10 included in the sensor devices 6 are explained.

Charge Output Elements

The charge output elements 10 have a function of outputting electric charges according to an external force applied to the force detection device 1, that is, an external force applied to at least one of the first base 2 and the second base 3.

Note that, since the charge output elements 10 included in the sensor devices 6A to 6D have the same configuration, one charge output element 10 is mainly explained.

As shown in FIG. 3, the charge output element 10 included in the sensor device 6 includes ground electrode layers 11, a first sensor 12, a second sensor 13, and a third sensor 14.

The first sensor 12 has a function of outputting electric charge Qx according to an external force (a shearing force). The second sensor 13 has a function of outputting electric charge Qz according to an external force (a compression/tensile force). The third sensor 14 outputs electric charge Qy according to an external force (a shearing force).

In the charge output element 10 included in the sensor device 6, ground electrode layers 11 and the sensors 12, 13, and 14 are stacked in parallel to one another. A direction in which the ground electrode layers 11 and the sensors 12, 13, and 14 are stacked is hereinafter referred to as "stacking direction LD". The stacking direction LD is a direction orthogonal to a normal NL2 of the upper surface 321 (or a normal NL1 of the lower surface 221). The stacking direction LD is parallel to the sandwiching direction SD.

The shape of the charge output element 10 is not particularly limited. However, in this embodiment, the shape of the charge output element 10 is formed in a square shape when viewed from a direction perpendicular to the inner wall surfaces 331 of the fourth members 33. Note that examples of other external shapes of the charge output elements 10 include other polygons such as a pentagon, a circle, and an ellipse.

The ground electrode layers 11, the first sensor 12, the second sensor 13, and the third sensor 14 are explained.

The ground electrode layers 11 are electrodes earthed to the ground (a reference potential point). A material forming the ground electrode layers 11 is not particularly limited. However, for example, gold, titanium, aluminum, copper, iron, or an alloy containing these kinds of metal is desirable. Among these materials, in particular, it is desirable to use stainless steel, which is an iron alloy. The ground electrode layers 11 formed of stainless steel have excellent durability and corrosion resistance.

The first sensor 12 has a function of outputting the electric charge Qx according to an external force (a shearing force) in a first detection direction, which is a direction orthogonal to the stacking direction LD (the first sandwiching direction), that is, the same as the direction of the normal NL2 (the normal NL1). That is, the first sensor 12 is configured to output positive chare or negative charge according to an external force. Note that an x-axis direction in a first piezoelectric layer 121 and a second piezoelectric layer 123 explained below is the first detection direction.

The first sensor 12 includes a first piezoelectric layer (a first detection plate (a first substrate)) 121, a second piezoelectric layer (a first detection plate (a first substrate)) 123 provided to be opposed to the first piezoelectric layer 121, and an output electrode layer 122 provided between the first piezoelectric layer 121 and the second piezoelectric layer 123.

The first piezoelectric layer 121 is configured by a Y-cut quartz plate and has an x axis, a y axis, and a z axis, which are crystal axes orthogonal to one another. The y axis is an axis along the thickness direction of the first piezoelectric layer 121. The x axis is an axis along the paper surface depth direction in FIG. 3. The z axis is an axis along the up-down direction in FIG. 3.

In the following explanation, the distal end side of the arrows shown in the figure is set as "+ (plus)" and the proximal end side of the arrows is set as "− (minus)". A direction parallel to the x axis is referred to as "x-axis direction", a direction parallel to the y axis is referred to as "y-axis direction", and a direction parallel to the z axis is referred to as "z-axis direction". Note that the same applies to the second piezoelectric layer 123, a third piezoelectric layer 131, a fourth piezoelectric layer 133, a fifth piezoelectric layer 141, and a sixth piezoelectric layer 143.

The second piezoelectric layer 123 is also configured by a Y-cut quartz plate and has an x axis, a y axis, and a z axis, which are crystal axes orthogonal to one another. The y axis is an axis along the thickness direction of the second piezoelectric layer 123. The x axis is an axis along the paper surface depth direction in FIG. 3. The z axis is an axis along the up-down direction in FIG. 3.

The output electrode layer 122 has a function of outputting, as the electric charge Qx, positive charges or negative charges generated in the first piezoelectric layer 121 and the second piezoelectric layer 123.

The second sensor 13 has a function of outputting the electric charge Qz according to an external force (a compression/tensile force). That is, the second sensor 13 is configured to output positive charge according to a compression force and output negative charge according to a tensile force. Note that the x-axis direction in the third piezoelectric layer 131 and the fourth piezoelectric layer 133 explained below is a direction of the compression and tensile forces to be detected.

The second sensor 13 includes the third piezoelectric layer (a third substrate) 131, the fourth piezoelectric layer (a third substrate) 133 provided to be opposed to the third piezoelectric layer 131, and an output electric layer 132 provided between the third piezoelectric layer 131 and the fourth piezoelectric layer 133.

The third piezoelectric layer 131 is configured by an X-cut quartz plate and has an x axis, a y axis, and a z axis orthogonal to one another. The x axis is an axis along the thickness direction of the third piezoelectric layer 131, the y axis is an axis along the up-down direction in FIG. 3, and the z axis is an axis along the paper surface depth direction in FIG. 3.

The fourth piezoelectric layer 133 is also configured by an X-cut quartz plate and has an x axis, a y axis, and a z axis orthogonal to one another. The x axis is an axis along the thickness direction of the fourth piezoelectric layer 133, the y axis is an axis along the up-down direction in FIG. 3, and the z axis is an axis along the paper surface depth direction in FIG. 3.

The output electrode layer 132 has a function of outputting, as the electric charge Qz, positive charges or negative charges generated in the third piezoelectric layer 131 and the fourth piezoelectric layer 133.

The third sensor 14 has a function of outputting the electric charge Qx according to an external force (a shearing force) in a second detection direction orthogonal to the stacking direction LD (the second sandwiching direction) and crossing the first detection direction of the external force acting when the first sensor 12 outputs the electric charge Qx. That is, the third sensor 14 is configured to output positive charge or negative charge according to an external force. Note that the x-axis direction in the fifth piezoelectric layer 141 and the sixth piezoelectric layer 143 explained below is the second detection direction.

The third sensor 14 includes the fifth piezoelectric layer (a second detection plate (a second substrate)) 141, the sixth piezoelectric layer (a second detection plate (a second substrate)) 143 provided to be opposed to the fifth piezoelectric layer 141, and an output electrode layer 142 provided between the fifth piezoelectric layer 141 and the sixth piezoelectric layer 143.

The fifth piezoelectric layer 141 is configured by a Y-cut quartz plate and has an x axis, a y axis, and a z axis, which are crystal axes orthogonal to one another. The y axis is an axis along the thickness direction of the fifth piezoelectric layer 141. The x axis is an axis along the up-down direction in FIG. 3. The z axis is an axis along the paper surface depth direction in FIG. 3.

The sixth piezoelectric layer 143 is also configured by a Y-cut quartz plate and has an x axis, a y axis, and a z axis, which are crystal axes orthogonal to one another. The y axis is an axis along the thickness direction of the sixth piezoelectric layer 143. The x axis is an axis along the up-down direction in FIG. 3. The z axis is an axis along the paper surface depth direction in FIG. 3.

In the charge output element 10, when viewed from the stacking direction LD, the x axes of the first piezoelectric layer 121 and the second piezoelectric layer 123 and the x axes of the fifth piezoelectric layer 141 and the sixth piezoelectric layer 143 cross each other. When viewed from the stacking direction LD, the z axes of the first piezoelectric layer 121 and the second piezoelectric layer 123 and the z axes of the fifth piezoelectric layer 141 and the sixth piezoelectric layer 143 cross each other.

The output electrode layer 142 has a function of outputting, as the electric charge Qy, positive charges or negative charges generated in the fifth piezoelectric layer 141 and the sixth piezoelectric layer 143.

In this way, in the charge output element 10, the first sensor 12, the second sensor 13, and the third sensor 14 are stacked such that force detection directions of the sensors are orthogonal to one another. Consequently, the sensors can respectively induce electric charges according to force components orthogonal to one another. Therefore, the charge output element 10 can output the three electric charges Qx, Qy, and Qz respectively according to external forces applied along the x axis, the y axis, and the z axis.

As explained above, the charge output element 10 can output the electric charge Qz. However, in the force detection device 1, it is desirable not to use the electric charge Qz when the external forces are calculated. That is, the force detection device 1 is desirably used as a device that detects a shearing force without detecting compression and tensile forces. Consequently, it is possible to reduce a noise component due to a temperature change of the force detection device 1. Note that, even if the electric charge Qz is not used when the external forces are calculated, the electric charge Qz is used for, for example, adjustment of pressurization by the pressurization bolts 71.

Note that, in this embodiment, all of the piezoelectric layers (the first piezoelectric layer 121, the second piezoelectric layer 123, the third piezoelectric layer 131, the fourth piezoelectric layer 133, the fifth piezoelectric layer 141, and the sixth piezoelectric layer 143) have configurations including quartz. However, the piezoelectric layers may have configurations including a piezoelectric material other than the quartz. Examples of the piezoelectric material other than the quartz include topaz, barium titanate, lead titanate, lead zirconate titanate (PZT: $Pb(Zr, Ti)O_3$), lithium niobate, and lithium tantalate. However, the piezoelectric layers desirably have configurations including the quartz. This is because the piezoelectric layers configured by the quartz have excellent characteristics such as a wide dynamic range, high rigidity, a high natural frequency, and a high withstand load property.

In this embodiment, the number of the piezoelectric layers of the first sensor 12, the second sensor 13, and the third sensor 14 is two. However, the number of the piezoelectric layers is not limited to this and may be, for example, one.

As explained above, the first base 2 and the second base 3 are fixed by the pressurization bolts 71.

As the fixing by the pressurization bolts 71, in a state in which the sensor devices 6 are disposed between the top surface 231 and the inner wall surface 331, the pressurization bolts 71 are inserted from the fourth members 33 side of the second base 3 toward the second members 24 of the first base 2. Male screws (not shown in the figure) of the pressurization bolts 71 are screwed in female screws 241 formed in the second members 24. In this way, pressure, that is, pressurization of predetermined magnitude is applied to the charge output element 10 by the first base 2 and the second base 3, that is, the second member 24 and the fourth member 33 of each of the packages 60 that houses the charge output element 10.

Note that each of the second members 24 and each of the fourth members 33 are fixed by the two pressurization bolts 71 to be displaceable (movable) by a predetermined amount each other. Since the second members 24 and the fourth members 33 are fixed to be displaceable by the predetermined amount each other, when a shearing force acts on the load output element 10 according to application of an external force (a shearing force) to the force detection device 1, a frictional force is surely generated among the layers forming the charge output element 10. Therefore, it is possible to surely detect electric charge. A pressurization direction by the pressurization bolts 71 is a direction parallel to the stacking direction LD.

Note that a force FA in the α-axis direction, a force FB in the β-axis direction, a force FC in the γ-axis direction, a rotating force MA around the α axis, a rotating force MB around the β axis, and a rotating force MC around the γ axis of the entire force detection device 1 are calculated on the basis of a signal proportional to a cumulative amount of charges from the charge output elements 10. In this embodiment, the four charge output elements 10 are provided.

However, if at least three charge output elements 10 are provided, it is possible to calculate the rotating forces MA, MB, and MC.

As explained above, with the force detection device 1, it is possible to attain a reduction in the weight of the force detection device 1 by forming the first member 22 and the third member 32 from the materials having small densities.

It is possible to increase the strength of the second members 24 and the fourth members 33 by forming the second members 24 and the fourth members 33 from the materials having large yield strengths. When the second members 24 and the fourth members 33 are connected and fixed by the pressurization bolts 71 to pressurize the charge output elements 10, it is possible to suppress deformation of the second members 24 and the fourth members 33. Consequently, it is possible to improve the detection accuracy of the force detection device 1.

By forming the second members 24 and the fourth members 33 from the materials having small coefficients of linear expansion, when the force detection device 1 is heated, it is possible to reduce an amount of deformation due to thermal expansion of the second members 24 and the fourth members 33. It is possible to suppress an unnecessary force from being applied to the charge output elements 10. Consequently, it is possible to improve the detection accuracy of the force detection device 1.

When first member 22 and the third member 32 thermally expand and warp, it is possible to reduce an amount of deformation of the first member 22 in the portion of the through-hole 20. Similarly, it is possible to reduce an amount of deformation of the third member 32 in the portion of the through-hole 30. The warp of the first member 22 is reduced by the through-hole 20. Similarly, the warp of the third member 32 is reduced by the through-hole 30. Consequently, it is possible to suppress an unnecessary force from being applied to the charge output element 10. It is possible to improve the detection accuracy of the force detection device 1.

Second Embodiment

Force Detection Device

Figure 6:
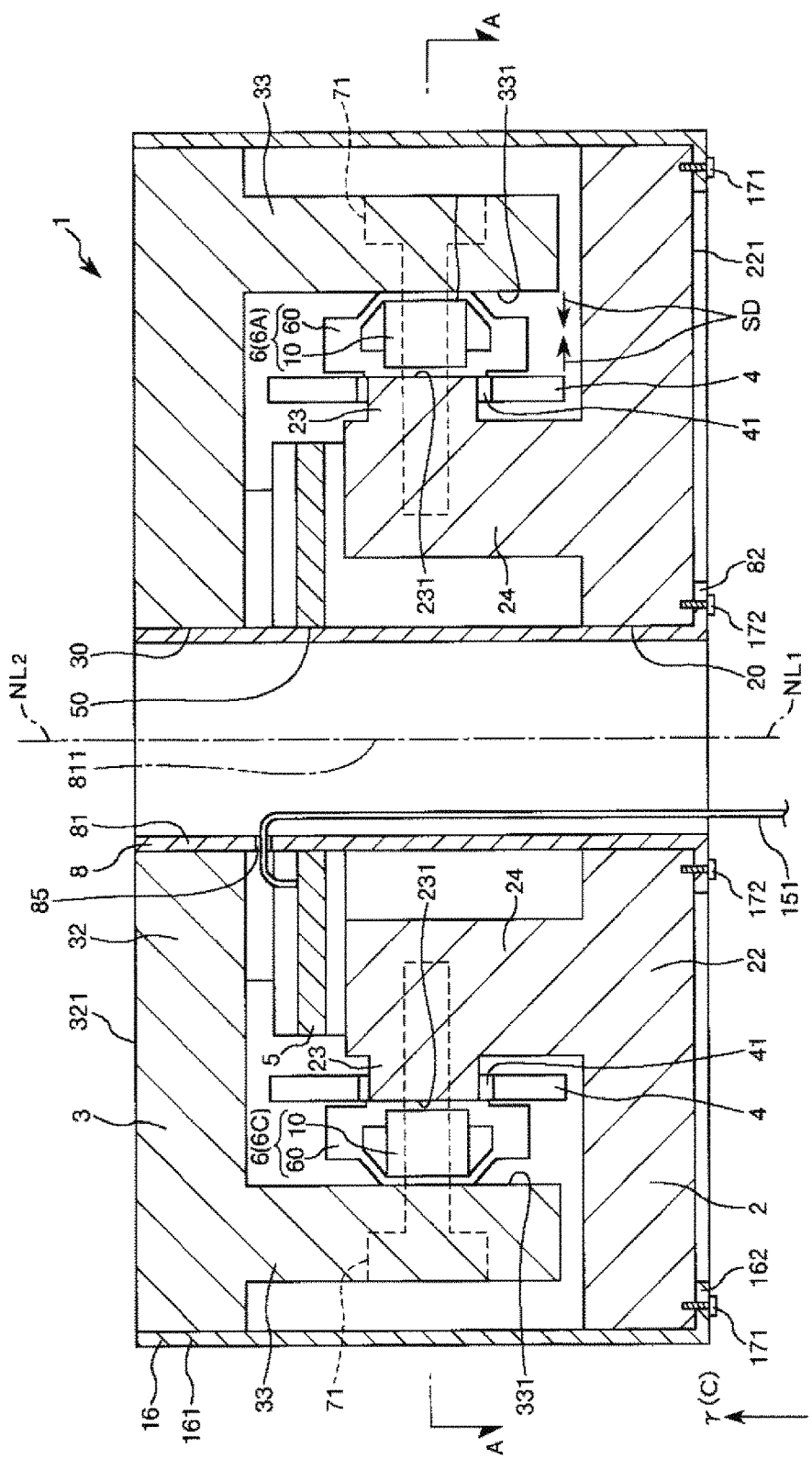
FIG. 6 is a sectional view (a B-B line sectional view in FIG. 7) showing a force detection device according to a second embodiment.
Figure 7:
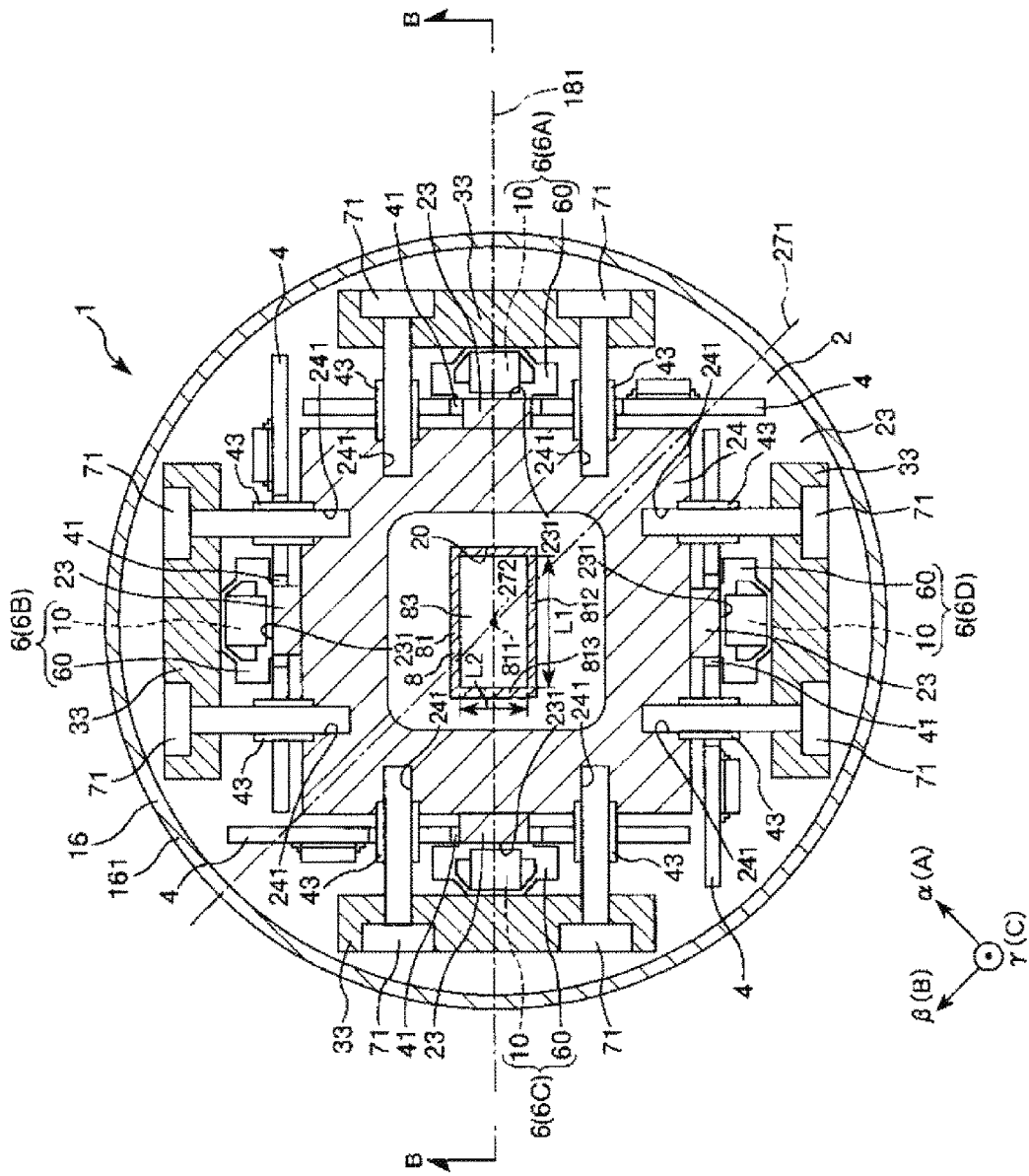
FIG. 7 is a sectional view (an A-A line sectional view in FIG. 6) of the force detection device shown in FIG. 6.
Figure 8:
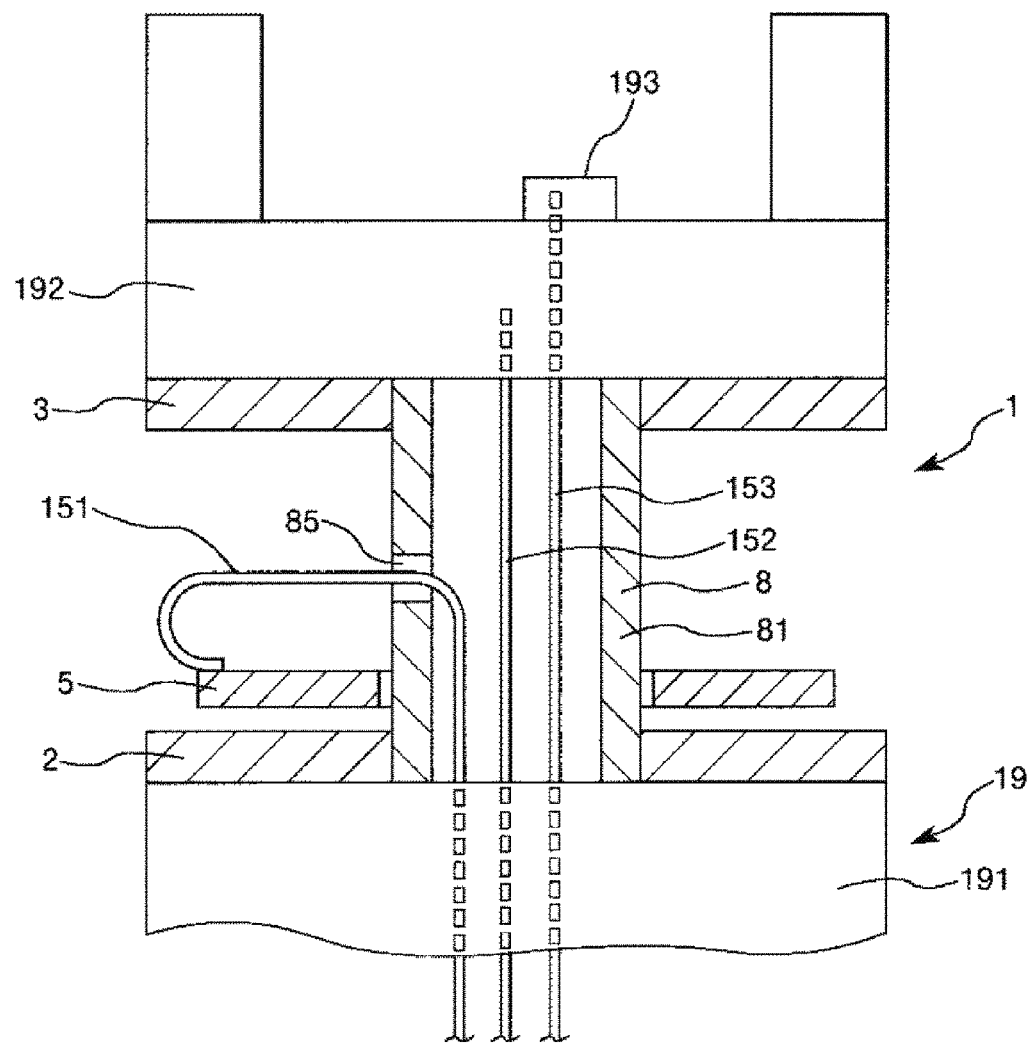
FIG. 8 is a diagram schematically showing application of the force detection device shown in FIG. 6 to a force detection device of a robot.
Figure 9:
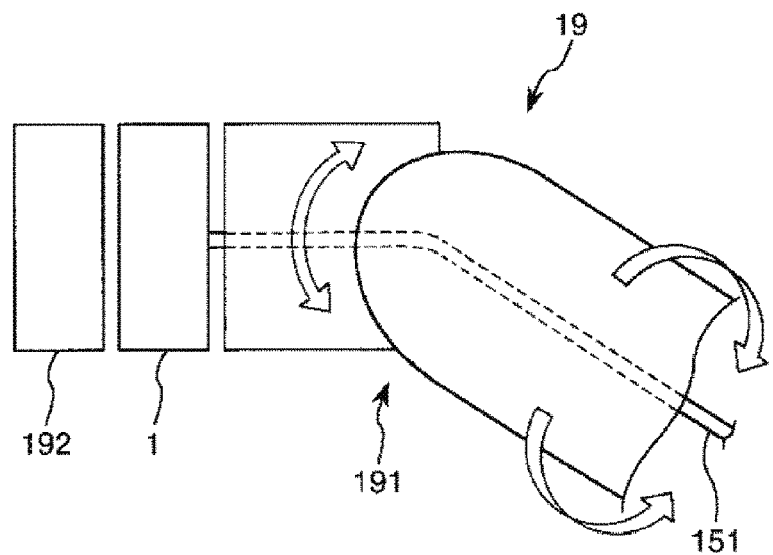
FIG. 9 is a diagram schematically showing application of the force detection device shown in FIG. 6 to a force detection device of a robot.
Figure 10:
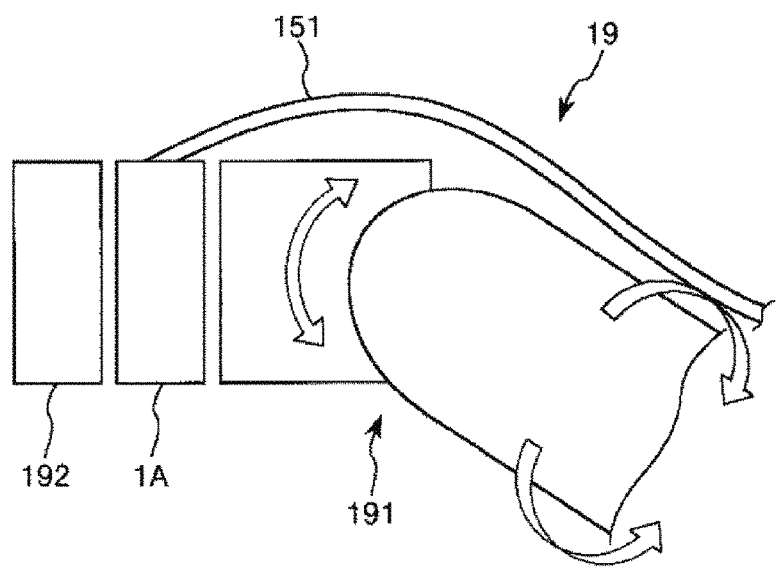
FIG. 10 is a diagram schematically showing application of a force detection device in the past to a force detection device of a robot.
Figure 11:
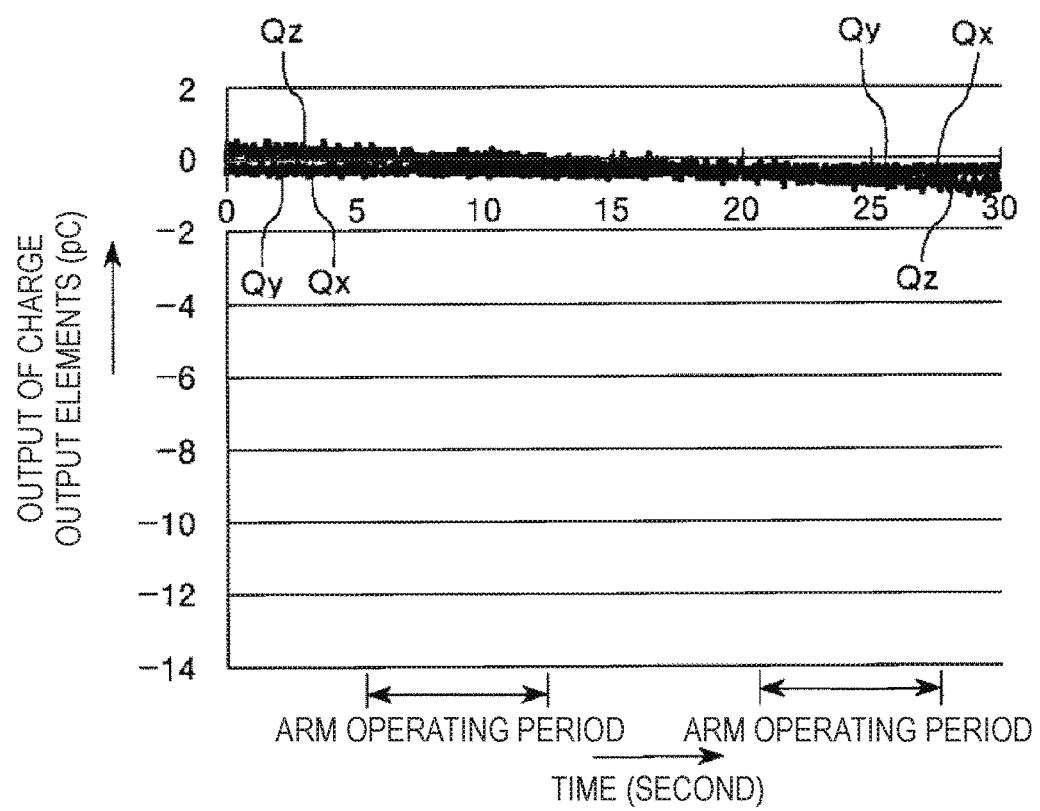
FIG. 11 is a graph showing an output of a charge output element of the force detection device shown in FIG. 9.
Figure 12:
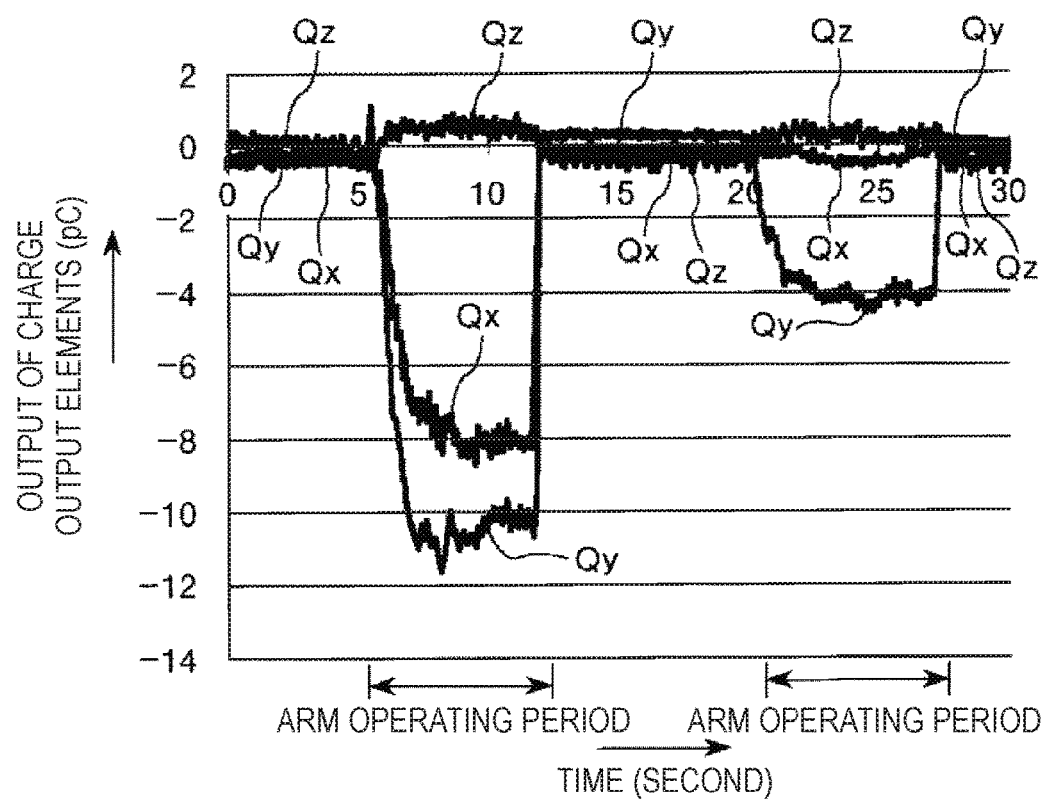
FIG. 12 is a graph showing an output of a charge output element of the force detection device in the past shown in FIG. 10.

FIG. 6 is a sectional view (a B-B line sectional view in FIG. 7) showing a force detection device according to a second embodiment. FIG. 7 is a sectional view (an A-A line sectional view in FIG. 6) of the force detection device shown in FIG. 6. FIG. 8 is a diagram schematically showing application of the force detection device shown in FIG. 6 to a force detection device of a robot. FIG. 9 is a diagram schematically showing application of the force detection device shown in FIG. 6 to a force detection device of a robot. FIG. 10 is a diagram schematically showing application of a force detection device in the past to a force detection device of a robot. FIG. 11 is a graph showing an output of a charge output element of the force detection device shown in FIG. 9. FIG. 12 is a graph showing an output of a charge output element of the force detection device in the past shown in FIG. 10.

In FIG. 7, an α axis, a β axis, and a γ axis are shown as three axes orthogonal to one another. In FIG. 6, among the three axes, only the γ axis is shown. A direction parallel to the α (A) axis is referred to as "α (A)-axis direction", a direction parallel to the β (B) axis is referred to as "β (B)-axis direction", and a direction parallel to the γ (C) axis is referred to as "γ (C)-axis direction". A plane defined by the α axis and the β axis is referred to as "αβ plane", a plane defined by the β axis and the γ axis is referred to as "βγ plane", and a plane defined by the α axis and the γ axis is referred to as "αγ plane". A direction parallel to the α axis is referred to as "α direction", a direction parallel to the β axis is referred to as "β direction", and a direction parallel to the γ axis is referred to as "γ direction". In the α direction, the β direction, and the γ direction, an arrow distal end side is set as a "+ (plus) side" and an arrow proximal end side is set as a "− (minus) side".

The force detection device 1 shown in FIG. 6 has a function of detecting an external force applied to the force detection device 1, that is, a six-axis force (translation force components in the α, β, and γ axis directions and rotating force components around the α, β, and γ axes).

The force detection device 1 in this embodiment is different from the force detection device 1 in the first embodiment in that, when the force detection device 1 is provided in a robot 19 (see FIG. 8), wires 151, 152, and 153 (see FIG. 8) are disposed to pass the inside of an inner bore wall 81 in the center portion of the force detection device 1. In the following explanation, components same as the components in the first embodiment are denoted by the same reference numerals and signs. Explanation of the components is omitted or simplified.

The force detection device 1 includes the first base 2, the second base 3 disposed a predetermined space apart from the first base 2 and opposed to the first base 2, a first opening 20 and a second opening 30 provided in the center portions of the first base 2 and the second base 3, an inner bore section 8, the sidewall section 16 provided in the outer circumferential portions of the first base 2 and the second base 3, the four analog circuit boards 4 housed (provided) between the first base 2 and the second base 3, the digital circuit board 5 housed (provided) between the first base 2 and the second base 3 and electrically connected to the analog circuit boards 4, the four sensor devices (pressure detecting sections) 6 respectively mounted on the analog circuit boards 4 and including the charge output elements (force detection elements) 10, which are elements that output signals (electric charges) according to a received external force, and the packages (housing sections) 60 that house the charge output elements 10, and the eight pressurization bolts 71. Note that the charge output elements (the piezoelectric elements) are illustrated as the force detection elements. However, the invention can be applied to, for example, a capacitance element and a distortion detection element as other force detection elements.

The wire (an electric wire) 151 is electrically connected (hereinafter simply referred to as "connected" as well) to the digital circuit board 5. That is, it can be said that the wire 151 is electrically connected to the charge output element 10 via the analog circuit board 4 and the digital circuit board 5. The wire 151 is used for, for example, communication with the force detection device 1 (e.g., transmission of an output signal from the force detection device 1) and power supply to the force detection device 1. That is, for example, electric power or various signals flow in the wire 151. Note that the wire 151 and the wires 152 and 153 explained below are respectively examples of a wire body.

The first opening 20 is formed in the center portion of the bottom plate 22 of the first base 2. Similarly, the second opening 30 is formed in the center portion of the top plate 32 of the second base 3. Similarly, a third opening 50 is formed in the center portion of the digital circuit board 5. That is, the first opening 20 is disposed in the center of a first attachment surface 221 and the second opening 30 is disposed in the center of a second attachment surface 321. The first opening 20, the second opening 30, and the third opening 50 are formed in a shape same as the external shape of the inner bore wall 81 of the inner bore section 8 explained below and are disposed in the same position when viewed from the thickness directions thereof.

As shown in FIGS. 6 and 7, the inner bore section 8 includes the inner bore wall 81 formed in a cylindrical shape. The inner bore section 8 is inserted into the first opening 20 of the first base 2, the second opening 30 of the second base 3, and the third opening 50 of the digital circuit board 5. That is, the inner bore section 8 is disposed astride the first base 2 and the second base 3 in the center portion of the force detection device 1 (the center portion of the bottom plate 22 of the first base 2 and the center portion of the top plate 32 of the second base 3). Consequently, in the center portion of the force detection device 1, the inner bore wall 81 is formed that opens in the first attachment surface 221 (a surface on the opposite side of the second base 3) of the bottom plate 22 of the first base 2 and the second attachment surface 321 (a surface on the opposite side of the first base 2) of the top plate 32 of the second base 3 and forms an inner bore of the inner bore section 8. The inner bore formed by the inner bore wall 81 is opened to the atmosphere on the outside of the force detection device 1 from the center portion of the bottom plate 22 of the first base 2 and the center of the top plate 32 of the second base 3.

The shape (the shape in plan view) of the inner bore wall 81 viewed from the direction of a center axis 811 of the inner bore wall 81 (the thickness direction of the first base 2 and the second base 3) is not particularly limited. However, in the configuration shown in the figure, the external shape and the internal shape of the inner bore wall 81 are respectively formed in rectangular shapes when viewed from the direction of the center axis 811 of the inner bore wall 81. Note that the corners of the rectangular shapes may be rounded or may be sharpened. Note that examples of other shapes of the inner bore wall 81 viewed from the direction of the center axis 811 include other quadrangles such as a square, other polygons such as a pentagon and hexagon, a circle, and an ellipse.

A through-hole 85 piercing through the inner bore wall 81 is formed on the side surface of the inner bore wall 81. The size of the hole diameter of the through-hole 85 is smaller than the inner bore section 8. By setting the hole diameter of the through-hole 85 small, it is possible to suppress dust and the like from intruding into the inside of the force detection device 1. The number of through-holes 85 is not particularly limited and may be one or may be plural. In the configuration shown in the figure, one through-hole 85 is provided. The shape of the through-hole 85 is not particularly limited. Examples of the shape of the through-hole 85 include quadrangles such as a square and a rectangle, polygons such as a pentagon and a hexagon, a circle, and an ellipse.

The first opening 20 has a function of a passage for allowing a predetermined wire such as the wire 151 to pass. The wire 151 passes through the first opening 20 and is led to the outside of the force detection device 1. That is, the wire 151 is inserted through the through-hole 85, passes through the inner bore section 8, and projects to the outside of the force detection device 1 from the first opening 20 of the first base 2.

Note that, in an example in which the force detection device 1 is provided between an arm 191 and an end effector 192 of the robot 19 as shown in FIG. 8, specific examples of a wire other than the wire 151 include a wire 152 of the end effector 192 such as a hand and a wire 153 of an electronic camera 193 provided in the end effector 192.

Since the inner bore section 8 is provided in the force detection device 1 in this way, effects explained below are obtained. Note that, in the following explanation, an example is explained in which the force detection device 1 is used as a force sensor of the robot 19.

First, the wire 151 passes through the through-hole 85 and the inner bore section 8 and is led to the inside of the arm 191 of the robot 19. The wire 152 of the end effector 192 and the wire 153 of the electronic camera 193 pass through the inner bore section 8 and are led to the inside of the arm 191 of the robot 19.

Consequently, when the arm 191 of the robot 19 moves, it is possible to suppress tension, bend, twist, and the like from occurring in the wires 151, 152, and 153. It is possible to suppress an unnecessary force from being applied to the force detection device 1. Consequently, it is possible to improve the detection accuracy of the force detection device 1.

The position of the through-hole 85 is not particularly limited as long as the position is between the first base 2 and the second base 3. In the configuration shown in the figure, the through-hole 85 is disposed on a short side 813 of the rectangle (the inner bore wall 81) when viewed from the direction of the center axis 811 of the inner bore wall 81. By determining that the through-hole 85 is disposed on the short side 813, it is possible to easily grasp the position of the through-hole 85 even if the through-hole 85 is unseen. Note that the through-hole 85 may be disposed on a long side 812 of the rectangle when viewed from the direction of the center axis 811 of the inner bore wall 81. In this case, by determining that the through-hole 85 is disposed on the long side 812, it is possible to easily grasp the position of the through-hole 85 even if the through-hole 85 is unseen.

The inner bore section 8 is disposed such that, when viewed from the direction of the center axis 811 of the inner bore wall 81, the direction of a straight line 181 connecting the charge output elements 10 of the two sensor devices 6A and 6C disposed to be opposed to each other via the center 272 of the first base 2 (the center of the force detection device 1) and the direction of the long side 812 of the rectangle coincide with each other. Note that it goes without saying that the posture of the inner bore section 8 is not limited to this.

The dimensions of the inner bore of the inner bore wall 81 are not particularly limited and are set as appropriate according to conditions. However, the sectional area of a cross section perpendicular to the center axis 811 of the inner bore wall 81 is desirably 100 mm$^2$ or more, more desirably 150 mm$^2$ or more and 100 cm$^2$ or less, and still more desirably 200 mm$^2$ or more and 20 cm$^2$ or less.

If the sectional area of the inner bore of the inner bore wall 81 is smaller than the lower limit value, depending on the other conditions, it is likely that it is difficult to allow the wire 151 to pass. If the sectional area is larger than the upper limit value, depending on the other conditions, it is likely that the rigidity of the force detection device 1 is deteriorated.

Length L1 in the long side direction of the inner bore wall 81 is desirably 12 mm or more, more desirably 16 mm or more and 500 mm or less, and still more desirably 20 mm or more and 100 mm or less.

If the length L1 in the long side direction of the inner bore wall 81 is smaller than the lower limit value, depending on the other conditions, it is likely that it is difficult to allow the wire 151 to pass. If the length L1 is larger than the upper limit value, depending on the other conditions, it is likely that the rigidity of the force detection device 1 is deteriorated.

Length L2 in the short side direction of the inner bore wall 81 is desirably 6 mm or more, more desirably 8 mm or more and 250 mm or less, and still more desirably 10 mm or more and 50 mm or less.

If the length L2 in the short side direction of the inner bore wall 81 is smaller than the lower limit value, depending on the other conditions, it is likely that it is difficult to allow the wire 151 to pass. If the length L2 is larger than the upper limit value, depending on the other conditions, it is likely that the rigidity of the force detection device 1 is deteriorated.

A flange 82 is formed on the side surface of the inner bore wall 81 in the vicinity of the first base 2. In the inner bore section 8, the flange 82 is fixed to the first base 2. A fixing method of the flange 82 is not particularly limited. However, in the configuration shown in the figure, the flange 82 is fixed to the bottom plate 22 of the first base 2 by a plurality of screws 172. On the other hand, the inner bore wall 81 in the vicinity of the second base 3 is only inserted into the second opening 30 of the second base 3 and is not fixed by screwing or the like. Note that the inner bore section 8 in the vicinities of the second members 24 may be fixed to the second base 3 rather than the inner bore section 8 in the vicinity of the first base 2.

Note that the constituent materials of parts other than the elements and the wires of the first base 2, the second base 3, the inner bore section 8, and the analog circuit boards 4 and parts other than the elements and the wires of the digital circuit board 5 are not particularly limited. For example, various resin materials and various metal materials can be used.

The first base 2 and the second base 3 are respectively configured by members generally formed in plate shapes. However, the shapes of the first base 2 and the second base 3 are not limited to this. For example, one member may be generally formed in a plate shape and the other member may be formed in a block shape.

The charge output elements 10 included in the sensor devices 6 are explained below.

Charge Output Elements

The charge output elements 10 have a function of outputting electric charges according to an external force applied to the force detection device 1, that is, an external force applied to at least one of the first base 2 and the second base 3.

Note that, since the charge output elements 10 included in the sensor devices 6A to 6D have the same configuration, one charge output element 10 is mainly explained.

Note that a force FA in the α-axis direction, a force FB in the β-axis direction, a force FC in the γ-axis direction, a rotating force MA around the α axis, a rotating force MB around the β axis, and a rotating force MC around the γ axis of the entire force detection device 1 are calculated on the basis of a signal proportional to a cumulative amount of electric charges from the charge output elements 10. In this embodiment, the four charge output elements 10 are provided. However, if at least three charge output elements 10 are provided, it is possible to calculate the rotating forces MA, MB, and MC.

An experiment explained below was performed on the force detection device 1 in this embodiment and a force detection device 1A in the past.

First, as shown in FIGS. 9 and 10, each of the force detection devices 1 and 1A was mounted between the arm 191 and the end effector 192 of the robot 19.

As shown in FIG. 9, in the case of the force detection device 1, the wire 151 was drawn out to the outside from the inner bore section 8 (see FIG. 8) and disposed on the inside of the arm 191.

As shown in FIG. 10, in the case of the force detection device 1A, one end portion of the wire 151 was connected to a terminal provided on the outer circumferential surface of the force detection device 1A. The wire 151 was disposed on the outside of the arm 191.

In a state in which an external force was not applied to the end effector 192, the robot 19 was actuated and outputs of the charge output elements 10 of the force detection devices 1 and 1A were measured. Results of the measurement are as shown in graphs of FIGS. 11 and 12.

Note that, in the graphs of FIGS. 11 and 12, an x axis, a y axis, and a z axis orthogonal to one another with respect to the charge output elements 10 of the force detection devices 1 and 1A are set. Electric charge output when a force is applied in the x-axis direction of the charge output elements 10 is represented as Qx, electric charge output when a force is applied in the y-axis direction is represented as Qy, and electric charge output when a force is applied in the z-axis direction is represented as Qz. The x-axis direction and the y-axis direction are directions shearing forces orthogonal to each other with respect to the charge output elements 10. The z-axis direction is a direction of a compression/tensile force with respect to the charge output elements 10. Since the measurement was performed in the state in which an external force is not applied to the end effector 192, the electric charges Qx, Qy, and Qz should originally be "0".

In the force detection device 1A in the past, as shown in FIG. 12, it is seen that, in an operating period of the arm 191, an output of the charge output elements 10 of the force detection device 1A, which should originally be "0", shifts to a minus side or a plus side. This is because, when the arm 191 moves, tension, bend, twist, and the like occur in the wire 151 and an unnecessary force is applied to the force detection device 1A.

On the other hand, in the force detection device 1 in this embodiment, as shown in FIG. 11, it is seen that, in both of an operating period and a non-operating period of the arm 191, an output of the charge output elements 10 of the force detection device 1, which should originally be "0", is substantially "0".

As explained above, when the force detection device 1 is provided in the robot 19, the wires 151, 152, and 153 are disposed to pass the inside of the inner bore wall 81 in the center portion of the force detection device 1. Therefore, with the force detection device 1, when the arm 191 moves, it is possible to suppress tension, bend, twist, and the like from occurring in the wires 151, 152, and 153. It is possible to suppress an unnecessary force from being applied to the force detection device 1. Consequently, it is possible to improve the detection accuracy of the force detection device 1.

In the center portion of the force detection device 1, an opening is not directly formed but the inner bore wall 81 is provided and the inner boar section 8 is formed using the inner bore of the inner bore wall 81. Therefore, it is possible to suppress dust and the like from intruding into the inside of the force detection device 1.

Single-Arm Robot

A single-arm robot, which is an embodiment of the robot according to the invention, is explained below with reference to FIG. 13. In the following explanation, concerning this embodiment, differences from the embodiments explained above are mainly explained. Explanation of similarities is omitted.

Figure 13:
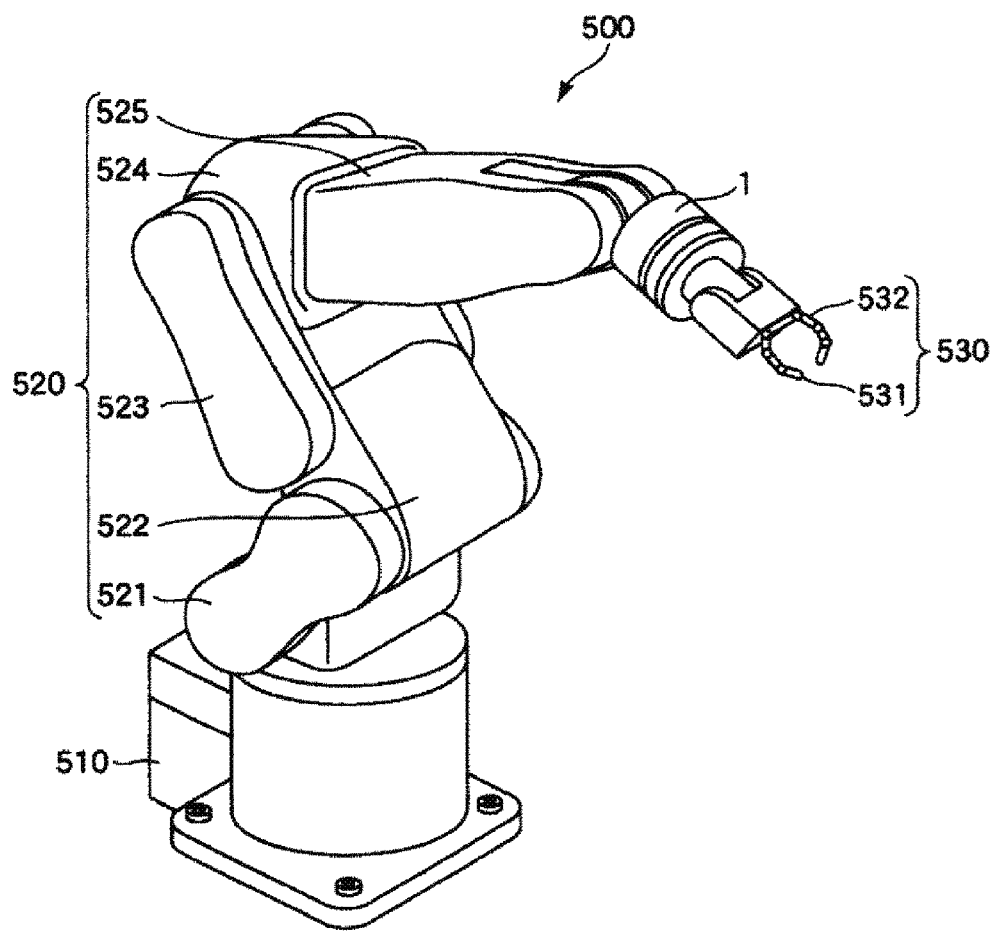
FIG. 13 is a diagram showing an example of a single-arm robot including a force detection device according to the invention.

FIG. 13 is a diagram showing an example of a single-arm robot including a force detection device according to the invention. A single-arm robot 500 shown in FIG. 13 includes a base 510, an arm 520, an end effector 530 provided on the distal end side of the arm 520, and the force detection device 1 provided between the arm. 520 and the end effector 530. Note that, as the force detection device 1, a force detection device same as the force detection devices in the embodiments explained above is used.

The base 510 has a function of housing an actuator (not shown in the figure) that generates power for turning the arm 520, a control section (not shown in the figure) that controls the actuator, and the like. The base 510 is fixed to, for example, a floor, a wall, a ceiling, or a movable truck.

The arm 520 includes a first arm element 521, a second arm element 522, a third arm element 523, a fourth arm element 524, and a fifth arm element 525. The arm 520 is configured by turnably coupling arm elements adjacent to one another. The arm 520 is driven by being rotated or bent in a complex manner centering on coupling sections of the arm elements according to the control by the control section.

The end effector 530 has a function of gripping a target object. The end effector 530 includes a first finger 531 and a second finger 532. After the end effector 530 reaches a predetermined operation position according to the driving of the arm 520, the end effector 530 can grip the target object by adjusting the clearance between the first finger 531 and the second finger 532.

Note that the end effector 530 is a hand in this embodiment. However, in the invention, the end effector 530 is not limited to this. Other examples of the end effector 530 include an instrument for component inspection, an instrument for component conveyance, an instrument for component machining, an instrument for component assembly, and a measuring device. The same applies to end effectors in other embodiments.

The force detection device 1 has a function of detecting an external force applied to the end effector 530. The force detected by the force detection device 1 is fed back to the control section of the base 510, whereby the single-arm robot 500 can execute more precise work. With the force detected by the force detection device 1, the single-arm robot 500 can detect, for example, contact of the end effector 530 with an obstacle. Therefore, the single-arm robot 500 can easily perform an obstacle avoiding action, a target object damage avoiding action, and the like, which are difficult in position control in the past. The single-arm robot 500 can execute work more safely.

Note that, in the configuration shown in the figure, the arm 520 is configured by five arm elements in total. However, the invention is not limited to this. The invention can also be applied when the arm 520 is configured by one arm element, when the arm 520 is configured by two to four arm elements, and when the arm 520 is configured by six or more arm elements.

Double-Arm Robot

A double-arm robot, which is an embodiment of the robot according to the invention, is explained with reference to FIG. 14. In the following explanation, concerning this embodiment, differences from the embodiments explained above are mainly explained. Explanation of similarities is omitted.

Figure 14:
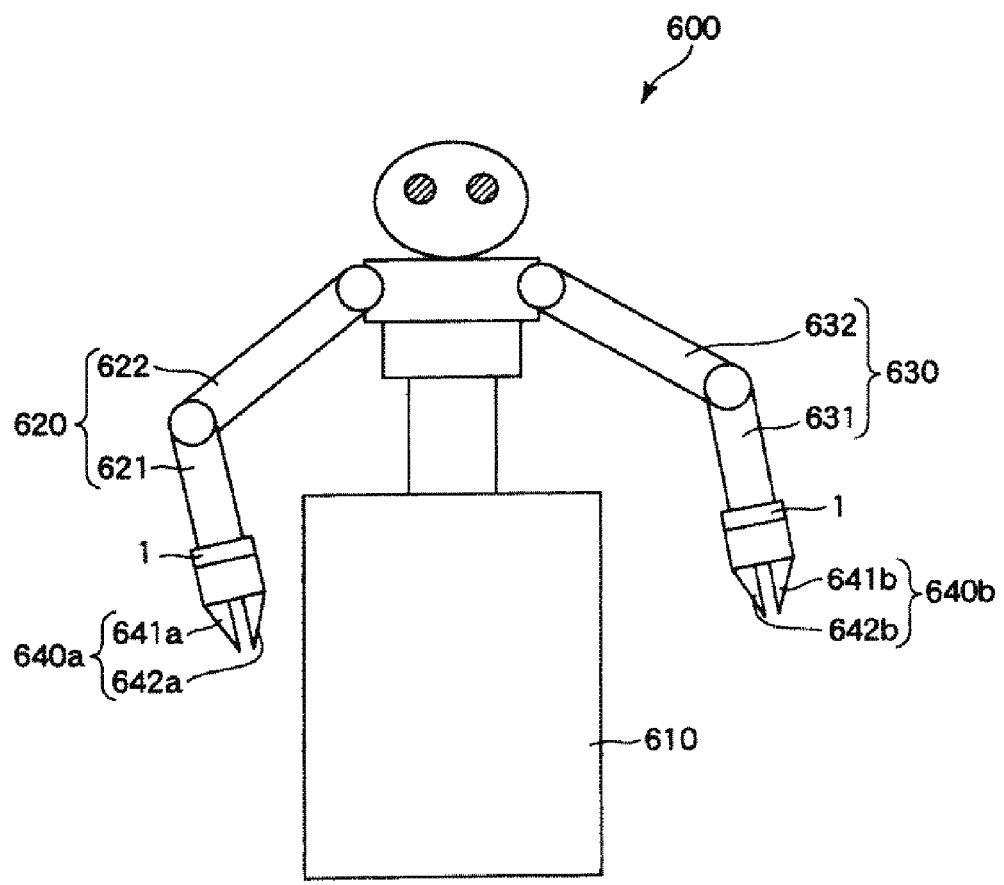
FIG. 14 is a diagram showing an example of a double-arm robot including the force detection device according to the invention.

FIG. 14 is a diagram showing an example of a double-arm robot including the force detection device according to the invention. A double-arm robot 600 shown in FIG. 14 includes a base 610, a first arm 620, a second arm 630, a first end effector 640a provided on the distal end side of the first arm 620, a second end effector 640b provided on the distal end side of the second arm 630, and the force detection devices 1 provided between the first arm 620 and the first end effector 640a and between the second arm 630 and the second end effector 640b. Note that, as the force detection devices 1, a force detection device same as the force detection device in the embodiments explained above is used.

The base 610 has a function of housing an actuator (not shown in the figure) that generates power for turning the first arm 620 and the second arm 630, a control section (not shown in the figure) that controls the actuator, and the like. The base 610 is fixed to, for example, a floor, a wall, a ceiling, or a movable truck.

The first arm 620 is configured by turnably coupling a first arm element 621 and a second arm element 622. The second arm 630 is configured by turnably coupling a first arm element 631 and a second arm element 632. The first arm 620 and the second arm 630 are driven by being rotated or bent in a complex manner centering on coupling sections of the arm elements according to the control by the control section.

The first and second end effectors 640a and 640b have a function of gripping a target object. The first end effector 640a includes a first finger 641a and a second finger 642a. The second end effector 640b includes a first finger 641b and a second finger 642b. After the first end effector 640a reaches a predetermined operation position according to the driving of the first arm 620, the first end effector 640a can grip the target object by adjusting the clearance between the first finger 641a and the second finger 642a. Similarly, after the second end effector 640b reaches a predetermined operation position according to the driving of the second arm 630, the second end effector 640b can grip the target object by adjusting the clearance between the first finger 641b and the second finger 642b.

The force detection device 1 has a function of detecting an external force applied to the first and second end effectors 640a and 640b. The force detected by the force detection device 1 is fed back to the control section of the base 610, whereby the double-arm robot 600 can execute work more precisely. With the force detected by the force detection device 1, the double-arm robot 600 can detect, for example, contact of the first and second end effector 640a and 640b with an obstacle. Therefore, the double-arm robot 600 can easily perform an obstacle avoiding action, a target object damage avoiding action, and the like, which are difficult in position control in the past. The double-arm robot 600 can execute work more safely.

Note that, in the configuration shown in the figure, the double-arm robot 600 includes two arms in total. However, the invention is not limited to this. The invention can also be applied when the double-arm robot 600 includes three or more arms.

The force detection device and the robot according to the invention are explained with reference to the embodiments shown in the figures. However, the invention is not limited to this. The configurations of the sections can be replaced with any configurations having the same functions. Any other components may be added to the invention.

In the invention, instead of the pressurization bolts, bolts not having a function of pressurizing the charge output elements (the piezoelectric elements) may be used. A fixing method other than the bolts may be adopted.

In the embodiments, the number of charge output elements is four. However, in the invention, the number of charge output elements may be one, two, three, or five or more.

The invention may be a combination of any two or more configurations (characteristics) of the embodiments. In the invention, one of the first opening and the second opening may be closed.

In the embodiments, the piezoelectric elements are illustrated as the force detection elements. However, the invention can also be applied to, for example, a capacitance element and a distortion detection element. In the embodiments, the number of force detection elements is four. However, the number of force detection elements may be two, three, or five or more.

In the embodiments, the wires (the electric wires) are illustrated as the wire bodies. However, examples of other wire bodies include a pipe in which gas flows.

The robot according to the invention is not limited to an arm-type robot (a robot arm) as long as the robot includes an arm. The robot may be robots of other forms, for example, a scalar robot and a leg-type walking (running) robot.

The force detection device according to the invention is not limitedly applied to the robot and can also be applied to other devices, for example, a conveying device such as an electronic component conveying device, an inspection device such as an electronic component inspection device, a component machining device, a mobile body, measuring devices such as a vibrometer, an accelerometer, a gravimeter, a dynamometer, a seismometer, and an inclinometer, and an input device.

The entire disclosures of Japanese Patent Application No. 2015-037880, filed Feb. 27, 2015 and No. 2015-022921, filed Feb. 9, 2015 are expressly incorporated by reference herein.

What is claimed is:

1. A force detection device comprising:
   a base plate including a plate-shaped first member, and a second member attached to the first member;
   a cover plate including a third and a fourth member; and
   a sensor device positioned between the base plate and cover plate, and having a piezoelectric element contained in a package;
   wherein the first member and the third member do not directly contact the sensor device,
   a material forming the first member is different from a material forming the second member,
   the second member protrudes in a direction toward the cover plate,
   a coefficient of linear expansion of the material forming the second member is smaller than a coefficient of linear expansion of the material forming the first member,
   a density of the material forming the first member is smaller than a density of the material forming the second member,
   a coefficient of linear expansion of a material which forms the fourth member is smaller than a coefficient of linear expansion of a material which forms the third member, and
   a density of the material which forms the third member is smaller than a density of the material which forms the fourth member.

2. The force detection device according to claim 1, wherein
   the piezoelectric element and the second member are disposed at an end portion of the first member, and
   a through-hole is formed in a center portion of the first member.

3. The force detection device according to claim 1,
   wherein the fourth member is joined to the third member and configured to sandwich the piezoelectric element in conjunction with the second member, wherein
   a material forming the third member is different from a material forming the fourth member.

4. The force detection device according to claim 3,
   wherein the piezoelectric element and the fourth member are disposed at an end portion of the third member, and
   a through-hole is formed in a center portion of the third member.

5. The force detection device according to claim 3, wherein the material forming the second member and the material forming the fourth member are the same.

6. The force detection device according to claim 3, wherein the material forming the first member and the material forming the third member are the same.

7. The force detection device according to claim 3, wherein yield strength of the material forming the fourth member is larger than yield strength of the material forming the third member.

8. The force detection device according to claim 1, wherein yield strength of the material forming the second member is larger than yield strength of the material forming the first member.

9. A robot comprising:
   an arm;
   an end effector provided in the arm; and
   the force detection device according to claim 1.

* * * * *